(12) United States Patent
Yang

(10) Patent No.: US 11,381,990 B2
(45) Date of Patent: Jul. 5, 2022

(54) FINE TIMING MEASUREMENT FTM METHOD AND COMMUNICATIONS DEVICE

(71) Applicant: HUAWEI TECHNOLOGIES CO., LTD., Guangdong (CN)

(72) Inventor: Xun Yang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 67 days.

(21) Appl. No.: 16/859,263

(22) Filed: Apr. 27, 2020

(65) Prior Publication Data

US 2020/0260313 A1 Aug. 13, 2020

Related U.S. Application Data

(63) Continuation of application No. 16/022,612, filed on Jun. 28, 2018, now Pat. No. 10,681,579, which is a (Continued)

(30) Foreign Application Priority Data

Dec. 29, 2015 (CN) .......................... 201511017027.2

(51) Int. Cl.
*H04W 24/10* (2009.01)
*H04W 64/00* (2009.01)
(Continued)

(52) U.S. Cl.
CPC ............... *H04W 24/10* (2013.01); *G01S 5/00* (2013.01); *H04J 3/0667* (2013.01);
(Continued)

(58) Field of Classification Search
CPC ..... H04W 24/10; H04W 24/00; H04W 4/025; H04W 64/00; H04W 72/0446;
(Continued)

(56) References Cited

U.S. PATENT DOCUMENTS 9,591,493 B2   3/2017  Gutierrez
9,668,101 B2 * 5/2017  Marri Sridhar ..... H04W 56/001
(Continued)

FOREIGN PATENT DOCUMENTS

CN   104113824 A   10/2014
CN   105120493 A   12/2015
(Continued)

OTHER PUBLICATIONS

IEEE Standard for Information technology—Telecommunications and information exchange between systems Local and metropolitan area networks—Specific requirements, Part 11: Wireless LAN Medium Access Control (MAC) and Physical Layer (PHY) Specifications. IEEE P802.11-REVmc/D4.0, Jan. 2015, 3730 pages.

*Primary Examiner* — Warner Wong
(74) *Attorney, Agent, or Firm* — Womble Bond Dickinson (US) LLP

(57) ABSTRACT

A fine timing measurement FTM method and a communications device are disclosed. The method includes: receiving an FTM request frame from at least two communications devices; and sending a first FTM measurement frame according to the FTM request frame, where the first FTM measurement frame includes a measurement parameter of each of the at least two communications devices and identifier information identifying each of the at least two communications devices, so that each communications device obtains the measurement parameter according to the identifier information.

20 Claims, 9 Drawing Sheets

Related U.S. Application Data continuation-in-part of application No. PCT/CN2016/112315, filed on Dec. 27, 2016.

(51) Int. Cl.

| | |
|---|---|
| *G01S 5/00* | (2006.01) |
| *H04W 56/00* | (2009.01) |
| *H04J 3/06* | (2006.01) |
| *H04W 4/02* | (2018.01) |
| *H04W 72/04* | (2009.01) |
| *G01S 13/74* | (2006.01) |
| *G01S 13/08* | (2006.01) |

(52) U.S. Cl.
CPC ........... *H04W 4/025* (2013.01); *H04W 56/00* (2013.01); *H04W 64/00* (2013.01); *H04W 72/0446* (2013.01); *G01S 13/08* (2013.01); *G01S 13/74* (2013.01)

(58) Field of Classification Search
CPC .......... H04W 56/0055; H04L 27/2665; H04L 25/0224; H04L 1/1678; H04L 47/283
See application file for complete search history.

(56) References Cited

U.S. PATENT DOCUMENTS

| | | | |
|---|---|---|---|
| 9,763,046 B2* | 9/2017 | Eyal | ............. H04L 9/3271 |
| 10,158,443 B1 | 12/2018 | Berger | |
| 10,187,817 B2* | 1/2019 | Sanderovich | ......... H04W 56/00 |
| 10,320,690 B1 | 6/2019 | Chu | |
| 2014/0335891 A1 | 11/2014 | Zhang et al. | |
| 2015/0092658 A1 | 4/2015 | Trainin | |
| 2015/0094103 A1 | 4/2015 | Wang | |
| 2015/0099538 A1 | 4/2015 | Wang | |
| 2015/0181553 A1 | 6/2015 | Segev | |
| 2015/0257028 A1 | 9/2015 | Chu | |
| 2015/0271776 A1 | 9/2015 | Michaelovich | |
| 2015/0365805 A1 | 12/2015 | Bajko | |
| 2016/0021496 A1* | 1/2016 | Tamhane | .............. H04W 24/10 455/456.2 |
| 2016/0021560 A1 | 1/2016 | Reshef | |
| 2016/0044524 A1 | 2/2016 | Ben-Haim | |
| 2016/0080960 A1* | 3/2016 | Aldana | ................. H04W 64/00 370/252 |
| 2016/0150499 A1 | 5/2016 | Aldana | |
| 2016/0183171 A1* | 6/2016 | Hareuveni | ........... H04W 8/005 370/328 |
| 2016/0234703 A1* | 8/2016 | Aldana | ............. H04W 72/0446 |
| 2016/0353306 A1 | 12/2016 | Sanderovich | |
| 2017/0064505 A1 | 3/2017 | Eyal | |
| 2017/0064575 A1* | 3/2017 | Eyal | ........................ G06F 21/44 |
| 2017/0086024 A1* | 3/2017 | Do | ........................ G01S 13/825 |
| 2017/0127412 A1* | 5/2017 | Amizur | ..................... G01S 5/00 |
| 2017/0149799 A1 | 5/2017 | Vamaraju | |
| 2017/0171766 A1 | 6/2017 | Amizur | |
| 2017/0187830 A1 | 6/2017 | Eyal | |
| 2017/0188191 A1 | 6/2017 | Aldana | |
| 2017/0188300 A1 | 6/2017 | Eyal | |
| 2018/0146385 A1 | 5/2018 | Aldana | |

FOREIGN PATENT DOCUMENTS

| | | |
|---|---|---|
| WO | 2014194144 A1 | 12/2014 |
| WO | 2015031031 A1 | 3/2015 |
| WO | 2015130712 A1 | 9/2015 |

* cited by examiner

| Status indication | Value | Reserved | Number of measurement groups | Duration | FTM interval | Partial timing |
|---|---|---|---|---|---|---|

| Reserved | Function indication | Reserved | ASAP | Duration | FTM interval | Partial timing | Quantity of times of FTM on each group | Reserved | FTM format and bandwidth | Measurement group period |
|---|---|---|---|---|---|---|---|---|---|---|

FIG. 5

FINE TIMING MEASUREMENT FTM METHOD AND COMMUNICATIONS DEVICE

CROSS-REFERENCE TO RELATED APPLICATIONS

This application is a continuation of U.S. patent application Ser. No. 16/022,612, filed on Jun. 28, 2018, which is a continuation of International Application No. PCT/CN2016/112315, filed on Dec. 27, 2016. The International Application claims priority to Chinese Patent Application No. 201511017027.2, filed on Dec. 29, 2015. All of the aforementioned patent applications are hereby incorporated by reference in their entireties.

TECHNICAL FIELD

This application relates to the communications field, and in particular, to a time-based measurement method, a fine timing measurement FTM method, and a communications device using the method.

BACKGROUND

Fine timing measurement (FTM) is applied to various fields in the modern science and technology, such as communications and positioning, and ranging. To prevent a measurement error caused by imprecise synchronization, in existing FTM measurement, measurement is performed using a method for measuring a time of flight of information in a one-to-one manner. A communications device and a response device that use the measurement method need to exchange information for multiple times, to learn of a distance between the communications device and the response device.

SUMMARY

When multiple communications devices perform ranging at the same time with one response device, by means of an existing FTM method, the response device needs to separately complete corresponding information exchange for multiple times with a current communications device, leading to a long measurement time and low measurement efficiency. Embodiments of this application provide a new procedure for fine timing measurement FTM, an FTM measurement frame is broadcast in a one-to-many manner, instead of sending multiple FTM measurement frames in a one-to-one manner as in the prior art. This can reduce an amount of interactions between a response device and multiple communications devices during FTM measurement, and the multiple communications devices can be measured at the same time, thereby shortening measurement duration and improving measurement efficiency.

According to a first aspect, a fine timing measurement FTM method is provided. The method includes: receiving an FTM request frame sent by at least two communications devices; and sending a first FTM measurement frame according to the FTM request frame, where the first FTM measurement frame includes a measurement parameter of each of the at least two communications devices and identifier information used to indicate each communications device, so that each communications device obtains the measurement parameter of each communications device according to the identifier information.

When FTM measurement is performed on multiple communications devices, the multiple communications devices can learn of, by receiving a same first FTM measurement frame, measurement parameters corresponding to the multiple communications devices, to perform FTM measurement. A response device may broadcast the first FTM measurement frame in a one-to-many manner, instead of sending multiple first FTM measurement frames in a one-to-one manner as in the prior art, so that interaction processes can be reduced to save a channel resource, and FTM measurement can be performed on the multiple communications devices at the same time, thereby shortening a measurement time and improving measurement efficiency. It should be understood that, a terminal or an access point having a Wi-Fi function may be a communications device or a response device.

In one embodiment, the first FTM measurement frame includes feedback indication information, and the feedback indication information is used to indicate a time interval at which each communications device sends response information after each communications device receives the first FTM measurement frame.

The multiple communications devices may sequentially send response information to the response device according to the feedback indication information, so that a sending failure caused by a response information collision can be prevented, and the response information can be accurately and efficiently fed back to the response device according to an indication, thereby improving measurement efficiency.

In one embodiment, the measurement method may further include: receiving the response information that is sent by each communications device according to the first FTM measurement frame; and sending a second FTM measurement frame, where the second FTM measurement frame includes a sending moment of the first FTM measurement frame, a receiving moment of the response information sent by each communications device, and the identifier information, so that each communications device obtains a corresponding receiving moment according to the identifier information.

The response device can send the first FTM measurement frame in a one-to-many manner, instead of sending multiple first FTM measurement frames in a one-to-one manner, and can send one second FTM measurement frame in a one-to-many manner, instead of sending multiple second FTM measurement frames in a one-to-one manner, so that FTM measurement can be performed on the multiple communications devices at the same time, and further, interaction processes are reduced, thereby improving measurement efficiency.

In one embodiment, there is a correspondence between a sequence of the identifier information of each communications device and a sequence of feeding back the response information by each communications device after each communications device receives the first FTM measurement frame.

The identifier information is used to instruct the multiple communications devices to obtain the measurement parameters corresponding to the multiple communications devices, and the sequence of the identifier information may further indicate a sequence of feeding back response information by each of the multiple communications devices, so that after receiving the identifier information, the communications device learns of the sequence of feeding back the response information by the communications device, thereby preventing an information transmission failure caused by a collision, and improving measurement efficiency.

In one embodiment, the identifier information includes a Media Access Control (MAC) address or an association identifier (AID).

In one embodiment, the first FTM measurement frame includes feedback indication information, and the feedback indication information is used to indicate a time interval at which each communications device feeds back response information after each communications device receives the first FTM measurement frame.

The multiple communications devices may sequentially send the response information to the response device at a particular time interval according to an indication of the feedback indication information, so that an information transmission failure caused by a communication collision can be prevented, and the response information can be accurately and efficiently fed back to the response device, thereby improving measurement efficiency.

In one embodiment, the at least two communications devices send first pieces of response information after a short interframe space SIFS after receiving the first FTM measurement frame.

In one embodiment, the measurement method may further include: after sending the first FTM measurement frame, sending a first non-data packet (NDP); and receiving a second NDP fed back by each communications device, and sending a second FTM measurement frame, where the second FTM measurement frame includes a sending moment of the first NDP, a receiving moment of the second NDP sent by each communications device, and the identifier information, so that each communications device obtains the sending moment and a corresponding receiving moment according to the identifier information.

Corresponding time information is obtained by exchanging NDPs, thereby improving measurement precision and further improving measurement accuracy.

In one embodiment, at least one of the FTM request frame or the first FTM measurement frame includes function indication information used to indicate that the communications device supports multi-user measurement.

The response device or the communications device can learn, by using the function indication information, whether the opposite party can perform a many-to-one measurement operation, thereby preventing the response device from blindly sending the first FTM measurement frame or preventing the communications device from blindly sending the FTM request frame.

In one embodiment, the first FTM measurement frame further includes at least one of quantity information or message length information, where the quantity information is used to indicate a quantity of the at least two communications devices; and the message length information is used to indicate a length occupied by each of time information and parameter information of each communications device, or the message length information is used to indicate a length occupied by time information or other information of each communications device.

Each communications device can learn of the specific quantity of the at least two communications devices by using the quantity information, so that each communications device can estimate, according to the quantity with reference to factors such as a sending sequence of each communications device and a time interval, a time of performing FTM measurement by each communications device, and each communications device can estimate a waiting time for measurement. Each communications device can more rapidly find the measurement parameter, the identifier information, or other information of each communications device by using the message length information, thereby improving measurement efficiency.

According to a second aspect, a fine timing measurement FTM method is provided. The method includes: receiving a first FTM request frame sent by at least one first communications device; sending a first FTM measurement frame according to the first FTM request frame; receiving response information that is sent by each of the at least one first communications device according to the first FTM measurement frame; receiving a second FTM request frame sent by at least one second communications device; and sending a second FTM measurement frame, where the second FTM measurement frame includes first identifier information used to indicate each first communications device, a sending moment of the first FTM measurement frame, a receiving moment of the response information of each first communications device, a measurement parameter of each of the at least one second communications device, and second identifier information used to indicate each second communications device, so that each first communications device obtains a corresponding receiving moment according to the first identifier information, and each second communications device obtains the measurement parameter of each second communications device according to the second identifier information.

The second FTM measurement frame is received, so that the first communications device can learn of the receiving moment corresponding to the first communications device, and further the second communications device can learn of the measurement parameter corresponding to the second communications device. By sending one second FTM measurement frame in a one-to-many manner, a response device can enable the first communications device and the second communications device to obtain respective required information, and does not need to send multiple FTM measurement frames in a one-to-one manner as in the prior art. Therefore, interaction processes can be reduced to save a channel resource, and FTM measurement can be performed on multiple communications devices at the same time, thereby reducing a measurement time and improving measurement efficiency.

In one embodiment, the first FTM measurement frame includes a measurement parameter of each first communications device and the first identifier information, so that each first communications device obtains the measurement parameter of each first communications device according to the first identifier information.

When FTM measurement is performed on multiple communications devices, the multiple communications devices can learn of, by receiving a same first FTM measurement frame and according to the first identifier information, measurement parameters corresponding to the multiple communications devices, to perform FTM. As a result, a quantity of interactions can be reduced, and FTM can be performed on the multiple communications devices at the same time, thereby further reducing a measurement time and improving measurement efficiency.

In one embodiment, the second FTM measurement frame includes feedback indication information, and the feedback indication information is used to indicate a time interval at which each second communications device sends response information after each second communications device receives the second FTM measurement frame.

The each second communications device may sequentially send the response information to the response device according to the feedback indication information, so that a transmission failure caused by a transmission collision can be prevented, and the response information can be accurately and efficiently fed back to the response device according to an indication, thereby improving measurement efficiency.

In one embodiment, there is a correspondence between a sequence of the second identifier information of each second communications device and a sequence of sending the response information by each second communications device after each second communications device receives the second FTM measurement frame.

The second identifier information is used to instruct the second communications device to obtain the measurement parameter corresponding to the second communications device, and the sequence of the second identifier information may further indicate a sequence of sending the response information by each second communications device, so that after receiving the identifier information, each second communications device learns of the sequence of sending the response information by each second communications device, thereby preventing an information transmission failure caused by a transmission collision, and improving measurement efficiency.

In one embodiment, both the first identifier information and the second identifier information include a MAC address or an AID.

In one embodiment, the second FTM measurement frame includes feedback indication information, and the feedback indication information is used to indicate a time interval at which by each second communications device sends response information after each second communications device receives the second FTM measurement frame.

Multiple second communications devices may sequentially send response information to the response device at a particular time interval according to an indication of the feedback indication information, so that an information transmission failure caused by a transmission collision can be prevented, and the response information can be accurately and efficiently fed back to the response device, thereby improving measurement efficiency.

In one embodiment, the at least two second communications devices feed back first pieces of response information after a short interframe space SIFS after receiving the first FTM measurement frame.

In one embodiment, the method may further include: receiving a first FTM request frame sent by the at least one first communications device; sending a first FTM measurement frame according to the first FTM request frame; after sending the first FTM measurement frame, sending a first NDP; receiving a second NDP sent by each of the at least one first communications device; receiving a second FTM request frame sent by the at least one second communications device; and sending a second FTM measurement frame, where the second FTM measurement frame includes first identifier information used to indicate each first communications device, a sending moment of sending the first NDP, a receiving moment of receiving the second NDP of each first communications device, a measurement parameter of each of the at least one second communications device, and second identifier information used to indicate each second communications device.

The second FTM measurement frame is received, so that the first communications device can learn of time information corresponding to the first communications device, and further the second communications device can learn of the measurement parameter corresponding to the second communications device. By sending one second FTM measurement frame, the response device can enable the first communications device and the second communications device to obtain respective required information, and does not need to send multiple FTM measurement frames as in the prior art. By means of the measurement method, interaction processes can be reduced to improve measurement efficiency, and corresponding time information is obtained by exchanging NDPs, thereby improving measurement precision.

In one embodiment, the method further includes: after sending the second FTM measurement frame, sending a third NDP; receiving a fourth NDP sent by each second communications device; and sending a third FTM measurement frame, where the third FTM measurement frame carries a sending moment of sending the third NDP, a receiving moment of receiving the fourth NDP of each second communications device, and the second identifier information.

After sending the third FTM measurement frame completely, the response device sends the third NDP to the second communications device, to obtain corresponding time information by exchanging NDPs, thereby improving measurement precision and further improving measurement accuracy.

In one embodiment, at least one of the first FTM request frame, the second FTM request frame, the first FTM measurement frame, or the second FTM measurement frame may include function indication information used to indicate that the communications device supports multi-user measurement.

The response device or the communications device can learn, using the function indication information, whether the opposite party can perform a many-to-one measurement operation, thereby preventing the response device from blindly sending the FTM measurement frame or preventing the communications device from blindly sending the FTM request frame.

In one embodiment, the second FTM measurement frame further includes at least one of quantity information or message length information, where the quantity information is used to indicate a sum of a quantity of the first communications devices and a quantity of the second communications devices; and the message length information is used to indicate a length occupied by each of time information and parameter information of each first communications device and each second communications device, or the message length information is used to indicate a length occupied by time information or other information of each second communications device.

The first communications device and the second communications device can learn of, using the quantity information, a specific quantity of communications devices participating in multi-user measurement, so that each second communications device can estimate, according to the quantity information and a factor such as a sending sequence of each second communications device or a time interval, a time of performing FTM by each second communications device. The first communications device and the second communications device can more rapidly find, by using the message length information, the identifier information corresponding to the first communications device and the identifier information corresponding to the second communications device, and information that needs to be obtained.

According to a third aspect, a fine timing measurement FTM method is provided. The method includes: sending, by a first communications device, an FTM request frame to a response device; receiving, by the first communications device, a first FTM measurement frame that is sent by the response device according to the FTM request frame, where the first FTM measurement frame includes a measurement parameter of each of at least two communications devices, and the first FTM measurement frame further includes identifier information used to indicate each communications device; and obtaining, by the first communications device, the measurement parameter of the first communications device in the at least two communications devices according to the identifier information.

The first communications device can obtain, according to the identifier information, the measurement parameter corresponding to the first communications device, to perform FTM. Therefore, the first communications device and multiple communications devices can receive a same first FTM measurement frame, to obtain respective measurement parameters. As a result, a quantity of interactions can be reduced, thereby shortening a measurement time and improving measurement efficiency.

In one embodiment, the first FTM measurement frame includes feedback indication information, and the feedback indication information is used to indicate a time interval at which the first communications device sends response information after the first communications device receives the first FTM measurement frame.

The first communications device can obtain, according to the feedback indication information, a moment of sending the response information to the response device by the first communications device, thereby preventing an information transmission failure caused by a transmission collision that occurs when the first communications device and another communications device send response information, and improving measurement efficiency.

In one embodiment, the measurement method further includes: sending, by the first communications device, the response information to the response device according to the first FTM measurement frame; receiving, by the first communications device, a second FTM measurement frame sent by the response device, where the second FTM measurement frame includes a sending moment of sending the first FTM measurement frame by the response device, a receiving moment of receiving the response information of each communications device by the response device, and the identifier information; and obtaining, by the first communications device according to the identifier information, a receiving moment corresponding to the first communications device.

The first communications device can obtain, according to the identifier information, the receiving moment corresponding to the first communications device, so that FTM measurement can be performed on the first communications device and multiple communications devices at the same time, thereby improving measurement efficiency.

In one embodiment, there is a correspondence between a sequence of the identifier information of the first communications device in the identifier information of the at least two communications devices and a sequence, of sending the response information by the first communications device after the first communications device receives the first FTM measurement frame, in sending the response information by the at least two communications devices after the at least two communications devices receive the first FTM measurement frame.

The identifier information can instruct the first communications device to obtain the measurement parameter corresponding to the first communications device, and the sequence of the identifier information may further indicate the sequence of sending the response information by the first communications device, so that after receiving the identifier information, the first communications device learns of a sequence of sending the response information by the first communications device, thereby preventing an information transmission failure caused by a transmission collision, and improving measurement efficiency.

In one embodiment, the identifier information includes a MAC address or an AID.

In one embodiment, the first FTM measurement frame includes feedback indication information, and the feedback indication information is used to indicate a time interval at which each communications device feeds back response information after each communications device receives the first FTM measurement frame.

The first communications device may send the response information to the response device at a particular time interval according to an indication of the feedback indication information, so that an information transmission failure caused by a transmission collision can be prevented, and the response information can be accurately and efficiently fed back to the response device, thereby improving measurement efficiency.

In one embodiment, the method may further include: after receiving the first FTM measurement frame, receiving, by the first communications device, a first NDP; sending, by the first communications device, a second NDP to the response device; receiving a second FTM measurement frame, where the second FTM measurement frame includes a sending moment of sending the first FTM measurement frame by the response device, a receiving moment of receiving the second NDP of each communications device by the response device, and the identifier information; and obtaining, by the first communications device according to the identifier information, a receiving moment corresponding to the first communications device.

Corresponding time information is obtained by exchanging NDPs, thereby improving measurement precision and further improving measurement accuracy.

In one embodiment, at least one of the FTM request frame or the first FTM measurement frame includes function indication information used to indicate that the communications device supports multi-user measurement.

The response device or the communications device can learn, using the function indication information, whether the opposite party can perform a many-to-one measurement operation, thereby preventing the response device from blindly sending the first FTM measurement frame or preventing the communications device from blindly sending the FTM request frame.

In one embodiment, the first FTM measurement frame further includes at least one of quantity information or message length information, where the quantity information is used to indicate a quantity of the at least two communications devices; and the message length information is used to indicate a length occupied by each of time information and parameter information of each communications device.

The first communications device can learn of the specific quantity of the at least two communications devices by using the quantity information, so that the first communications device can estimate, according to the quantity and with reference to a factor such as a sending sequence of the first communications device or a time interval, a waiting time for measurement, thereby preventing the communications device from blindly sending the response information or participating in FTM. The first communications device can more rapidly find the measurement parameter of the first communications device by using the message length information, thereby improving measurement efficiency.

According to a fourth aspect, a fine timing measurement FTM method is provided. The method includes: sending, by a first communications device, a first FTM request frame to a response device; receiving, by the first communications device, a first FTM measurement frame that is sent by the response device according to the first FTM request frame; sending, by the first communications device, response information to the response device; receiving, by the first communications device, a second FTM measurement frame sent by the response device, where the second FTM measurement frame includes first identifier information used to indicate the first communications device, a sending moment of sending the first FTM measurement frame by the response device, a receiving moment of receiving the response information of the first communications device by the response device, a measurement parameter of each of at least one second communications device, and second identifier information used to indicate each second communications device; and obtaining, by the first communications device according to the first identifier information, a receiving moment corresponding to the first communications device.

The first communications device can obtain the corresponding receiving moment according to the first identifier information, so that FTM measurement can be performed on the first communications device and multiple communications devices at the same time, thereby improving measurement efficiency.

In one embodiment, the first FTM measurement frame includes a measurement parameter of the first communications device and the first identifier information; and the method further includes: obtaining, by the first communications device, the measurement parameter of the first communications device according to the first identifier information.

When FTM is performed on the multiple communications devices, the first communications device can learn of, by using the first identifier information, the measurement parameter corresponding to the first communications device, to perform FTM measurement. Therefore, interaction processes can be reduced to save a channel resource, and FTM measurement can be performed on the first communications device and the multiple communications devices at the same time, thereby improving measurement efficiency.

In one embodiment, the second FTM measurement frame includes feedback indication information, and the feedback indication information is used to indicate a time interval at which each second communications device sends response information after each second communications device receives the second FTM measurement frame.

Each second communications device can determine, according to the feedback indication information, a moment of sending the response information to the response device by each second communications device, thereby preventing an information transmission failure caused by a transmission collision that occurs when each second communications device and another communications device send response information, and improving measurement efficiency.

In one embodiment, there is a correspondence between a sequence of the second identifier information of each second communications device and a sequence of sending the response information by each second communications device after each second communications device receives the second FTM measurement frame.

In one embodiment, both the first identifier information and the second identifier information include a MAC address or an AID.

In one embodiment, the second FTM measurement frame includes feedback indication information, and the feedback indication information is used to indicate a time interval at which each second communications device sends the response information after each second communications device receives the second FTM measurement frame.

Multiple second communications devices may sequentially send response information to the response device at a particular time interval according to an indication of the feedback indication information, so that an information transmission failure caused by a transmission collision can be prevented, and the response information can be accurately and efficiently sent to the response device, thereby improving measurement efficiency.

In one embodiment, the at least two second communications devices feed back first pieces of response information after a short interframe space SIFS after receiving the second FTM measurement frame.

In one embodiment, the measurement method may further include: sending an FTM request frame to the response device; receiving a first FTM measurement frame sent by the response device; receiving a first NDP data packet sent by the response device; sending a second NDP to the response device; receiving a second FTM measurement frame sent by the response device, where the second FTM measurement frame includes first identifier information used to indicate the first communications device, a sending moment of sending the first NDP by the response device, a receiving moment of receiving the second NDP of the first communications device by the response device, a measurement parameter of each of the at least one second communications device, and second identifier information used to indicate the second communications device; and obtaining, according to the first identifier information, a receiving moment corresponding to the first communications device.

The first communications device can learn of, by using the second identifier information, time information corresponding to the first communications device. By sending one second FTM measurement frame, the response device can enable the first communications device and the second communications device to obtain respective required information, and does not need to send multiple FTM measurement frames as in the prior art. By means of the measurement method, interaction processes can be reduced to improve measurement efficiency, and corresponding time information is obtained by exchanging NDPs, thereby improving measurement precision.

In one embodiment, the measurement method further includes: after the second communications device receives the second FTM measurement frame sent by the response device, receiving, by the second communications device, a third NDP sent by the response device; sending, by the second communications device, a fourth NDP to the response device; receiving, by the second communications device, a third FTM measurement frame sent by the response device, where the third FTM measurement frame includes a sending moment of sending the third NDP by the response device, a receiving moment of receiving the fourth NDP of the second communications device by the response device, and the second identifier information used to indicate the second communications device; and obtaining, by the second communications device, a corresponding receiving moment according to the second identifier information.

Corresponding time information is obtained by exchanging NDPs, thereby improving measurement precision and further improving measurement accuracy.

In one embodiment, at least one of the first FTM request frame, the second FTM request frame, the first FTM measurement frame, or the second FTM measurement frame includes function indication information used to indicate that the communications device supports multi-user measurement.

The response device or the communications device can learn, using the function indication information, whether the opposite party can perform a many-to-one measurement operation, thereby preventing the response device from blindly sending the corresponding FTM measurement frame or preventing the communications device from blindly sending the FTM request frame.

In one embodiment, the second FTM measurement frame further includes at least one of quantity information or message length information, where the quantity information is used to indicate a sum of a quantity of the first communications devices and a quantity of the second communications devices; and the message length information is used to indicate a length occupied by each of time information and parameter information of each first communications device and each second communications device, or the message length information is used to indicate a length occupied by time information or other information of each first communications device and each second communications device.

The first communications device and the second communications device can learn of, by using the quantity information, a specific quantity of communications devices participating in the multi-user measurement, so that each second communications device can estimate an FTM measurement delay according to the quantity information and a factor such as a sending sequence of each second communications device or a time interval, thereby improving measurement efficiency. The first communications device and the second communications device can more rapidly find, by using the message length information, the identifier information corresponding to the first communications device and the identifier information corresponding to the second communications device, and information that needs to be obtained.

According to a fifth aspect, a communications device is provided, configured to perform the method according to any one of the first aspect or the embodiments of the first aspect. Specifically, the communications device includes a receiving module and a sending module that are configured to perform any one of the first aspect or the embodiments of the first aspect.

According to a sixth aspect, a communications device is provided, configured to perform the method according to any one of the second aspect or the embodiments of the second aspect. Specifically, the communications device includes a receiving module and a sending module that are configured to perform the method according to any one of the second aspect or the embodiments of the second aspect.

According to a seventh aspect, a communications device is provided, configured to perform the method according to any one of the third aspect or the possible implementations of the third aspect. Specifically, the communications device includes a receiving module, a sending module, and an obtaining module that are configured to perform the method according to any one of the third aspect or the embodiments of the third aspect.

According to an eighth aspect, a communications device is provided, configured to perform the method according to any one of the fourth aspect or the embodiments of the fourth aspect. Specifically, the communications device includes a receiving module, a sending module, and an obtaining module that are configured to perform the method according to any one of the fourth aspect or the embodiments of the fourth aspect.

According to a ninth aspect, a communications device is provided, including: a transceiver, a memory, a processor, and a bus system. The transceiver, the memory, and the processor are connected by using the bus system; the memory is configured to store an instruction; the processor is configured to execute the instruction stored in the memory; the processor is further configured to control the transceiver to receive and send information or a signal; and when the processor executes the instruction stored in the memory, the execution enables the processor to perform the method according to any one of the first aspect or any embodiments of the first aspect.

According to a tenth aspect, a communications device is provided, including: a transceiver, a memory, a processor, and a bus system. The transceiver, the memory, and the processor are connected by using the bus system; the memory is configured to store an instruction; the processor is configured to execute the instruction stored in the memory; the processor is further configured to control the transceiver to receive and send information or a signal; and when the processor executes the instruction stored in the memory, the execution enables the processor to perform the method according to any one of the second aspect or any embodiments of the second aspect.

According to an eleventh aspect, a communications device is provided, including: a transceiver, a memory, a processor, and a bus system. The transceiver, the memory, and the processor are connected by using the bus system; the memory is configured to store an instruction; the processor is configured to execute the instruction stored in the memory; the processor is further configured to control the transceiver to receive and send information or a signal; and when the processor executes the instruction stored in the memory, the execution enables the processor to perform the method according to any one of the third aspect or any embodiments of the third aspect.

According to a twelfth aspect, a communications device is provided, including: a transceiver, a memory, a processor, and a bus system. The transceiver, the memory, and the processor are connected by using the bus system; the memory is configured to store an instruction; the processor is configured to execute the instruction stored in the memory; the processor is further configured to control the transceiver to receive and send information or a signal; and when the processor executes the instruction stored in the memory, the execution enables the processor to perform the method according to any one of the fourth aspect or any embodiments of the fourth aspect.

According to a thirteenth aspect, a computer readable medium is provided, configured to store a computer program, where the computer program includes instructions for performing the method according to any one of the first aspect or the possible implementations of the first aspect.

According to a fourteenth aspect, a computer readable medium is provided, configured to store a computer program, where the computer program includes instructions for performing the method according to any one of the second aspect or the embodiments of the second aspect.

According to a fifteenth aspect, a computer readable medium is provided, configured to store a computer program, where the computer program includes instructions for performing the method according to any one of the third aspect or the possible implementations of the third aspect.

According to a sixteenth aspect, a computer readable medium is provided, configured to store a computer program, where the computer program includes instructions for performing the method according to any one of the fourth aspect or the embodiments of the fourth aspect.

During implementation of this application, a measurement parameter field carries a measurement parameter; the measurement parameter field may include a status indication used to indicate a request success or failure; a value used to set a time length; reserved; the number of measurement groups (Number of bursts exponent) used to indicate a quantity of measurement groups; duration (e.g., Burst Duration): a time that lasts; an FTM interval (e.g., Min Deltan FTM) used to indicate a time interval between two consecutive FTM measurement frames; partial timing (e.g., Partial TSF timer) used to indicate a time of sending a first FTM measurement frame by a response device after the response device receives an FTM request; a function indication (ASAP capable) used to indicate whether a time stamp of the first FTM measurement frame can be obtained and fed back in a subsequent FTM frame; ASAP used to indicate whether FTM measurement is expected to start as soon as possible; a quantity of times (FTMs per burst) used to indicate a quantity of times of performing FTM measurement during measurement on one group; an FTM format and bandwidth (FTM) used to indicate an FTM frame type and an occupied bandwidth (for example, the type is an 11n type or an 11ac type, and the bandwidth is 20 M, or 40 M, or 80 M); and a measurement group period (Burst period) used to indicate duration of a measurement group (burst).

The foregoing and other aspects of this application are clearer and easier to understand in descriptions of the following multiple embodiments.

BRIEF DESCRIPTION OF DRAWINGS

FIG. 5 is a schematic diagram of a measurement parameter field in an FTM measurement frame according to an embodiment of this application;

DESCRIPTION OF EMBODIMENTS

The following clearly and describes the technical solutions in the embodiments of this application with reference to the accompanying drawings in the embodiments of this application.

A communications device and a response device may both communicate with one or more core networks by using a radio access network (RAN). Each of the communications device and the response device may be a mobile terminal such as a mobile phone (or referred to as a "cellular" phone) or a computer with a mobile terminal. For example, each of the communications device and the response device may be a portable, pocket-sized, handheld, computer built-in, or in-vehicle mobile apparatus, which exchanges voice or data with the radio access network or may exchange voice and data at the same. Each of the communications device and the response device may also be a device such as an access point AP (Access Point) or a base station. Generally, a terminal having a Wi-Fi function may be a communications device or a response device.

Figure 1:
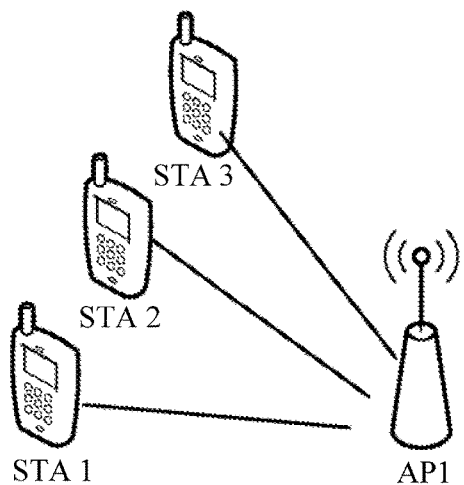
FIG. 1 is a schematic diagram of an application scenario of a measurement method according to an embodiment of this application.

Before the embodiments of this application are described, an application scenario of the embodiments of this application is first described. The embodiments of this application may be applied to a network architecture based on a Wi-Fi technology. FIG. 1 is a schematic diagram of an application scenario of a positioning method of a communications device according to an embodiment of this application. In the application scenario in FIG. 1, multiple communications devices may send FTM requests to a same response device. By means of a method in the prior art, the response device needs to interact with each communications device for multiple times. If in an intensive scenario, for example, a public place such as an airport, a bus stop, or a hospital, the communications device needs to take a longer time to perform FTM with the response device, leading to a long time of the measurement method and low efficiency. The response device is not limited to a central control node such as an AP or a station device STA (Station). The AP or the STA may be used as a response device in a particular period of time, or may be used as a communications device sending a measurement request in a particular period of time.

Figure 2:
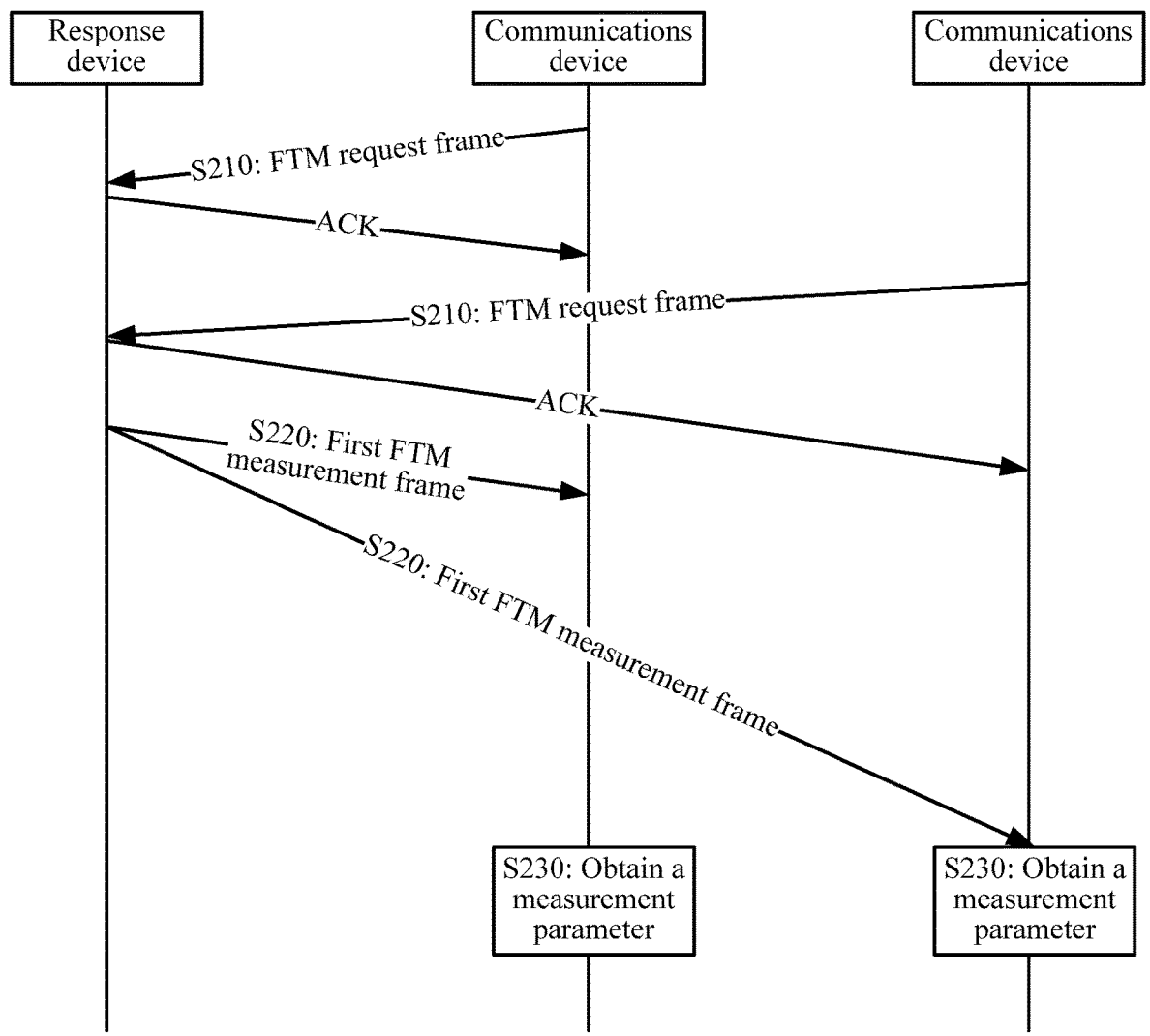
FIG. 2 is a schematic flowchart of a measurement method according to an embodiment of this application.

FIG. 2 is a schematic flowchart of a measurement method 200 according to an embodiment of this application. The measurement method 200 may include the following operations:

S210: At least two communications devices send fine timing measurement FTM request frames to a response device.

Operation S220: The response device sends a first FTM measurement frame according to the FTM request frame, where the first FTM measurement frame includes a measurement parameter used to indicate each of the at least two communications devices and identifier information used to indicate each communications device.

Operation S230: Each communications device obtains the corresponding measurement parameter according to the identifier information.

Specifically, the at least two communications devices may send the FTM request frames to the response device. After the response device receives the FTM request frames sent by the at least two communications devices, the response device may broadcast the first FTM measurement frame to the at least two communications devices. The first FTM measurement frame includes the measurement parameter of each communications device and the identifier information used to indicate each communications device. Optionally, the identifier information may include a MAC address or an association identifier AID. The identifier information may be a MAC address of the communications device or an AID of the communications device. After receiving the first FTM measurement frame, each communications device may obtain the measurement parameter of each communications device by using the identifier information, so that FTM measurement can be performed on each communications device according to the obtained measurement parameter.

Using two communications devices as an example, the two communications devices may be a first communications device and a second communications device. The first communications device and the second communications device separately send an FTM request frame to the response device. After receiving the two FTM request frames, the response device may broadcast a first FTM measurement frame to the two communications devices. The FTM measurement frame includes a first measurement parameter of the first communications device, a second measurement parameter of the second communications device, first identifier information used to indicate the first communications device, and second identifier information used to indicate the second communications device. Optionally, the first identifier information may be a MAC address of the first communications device, and the second identifier information may be a MAC address of the second communications device. After receiving the first FTM measurement frame, the first communications device may obtain the first measurement parameter of the first communications device according to the first identifier information. Similarly, the second communications device may also obtain the second measurement parameter of the second communications device according to the second identifier information. The first communications device and the second communications device can learn of the respective measurement parameters by receiving a same FTM measurement frame, to perform FTM measurement. By sending one FTM measurement frame, the response device can enable the two communications devices to obtain respective required measurement parameters, and different from the prior art, the response device does not need to separately send a first FTM measurement frame to the first communications device and the second communications device. If multiple communications devices are measured, the multiple communications devices can learn of respective measurement parameters at the same time by receiving a same first FTM measurement frame, to perform FTM, so that a quantity of interactions times can be reduced, and the multiple communications devices are measured at the same time, thereby improving measurement efficiency.

From the perspective of the response device, the execution body may be the response device. The measurement method 200 may be expressed as: receiving FTM request frames sent by at least two communications devices; and sending a first FTM measurement frame according to the FTM request frame, where the first FTM measurement frame includes a measurement parameter of each of the at least two communications devices and identifier information used to indicate each communications device.

Specifically, the response device may receive the FTM request frames sent by the at least two communications devices, and broadcast the first FTM measurement frame to the at least two communications devices according to the FTM request frame. The first FTM measurement frame may include the measurement parameter of each of the at least two communications devices and the identifier information used to indicate each communications device. After receiving multiple FTM requests, the response device may broadcast the first FTM measurement frame to the multiple communications devices, so that a quantity of interactions can be reduced, and the multiple communications devices are measured at the same time, thereby shortening measurement duration and improving measurement efficiency.

From the perspective of a communications device, the execution body may be the first communications device in the at least two communications devices, or may be a measurement apparatus in the communications device, or may be a network system controlling the communications device. Using an example in which the first communications device is used as the execution body, the measurement method 200 may also be expressed as: sending, by the first communications device, an FTM request frame to a response device; receiving, by the first communications device, a first FTM measurement frame that is sent by the response device according to the FTM request frame, where the first FTM measurement frame includes a measurement parameter of each of the at least two communications devices, and the first FTM measurement frame further includes identifier information used to indicate each communications device; and obtaining, by the first communications device, the measurement parameter of the first communications device in the at least two communications devices according to the identifier information.

Specifically, the first communications device may send the FTM request frame to the response device, and the first communications device may further receive the first FTM measurement frame that is sent by the response device according to the FTM request frame, where the first FTM measurement frame may include measurement parameters of multiple communications devices and identifier information of the multiple communications devices. The multiple communications devices include the first communications device. For example, the first FTM measurement frame includes a first measurement parameter and first identifier information of the first communications device, and may further include measurement parameters and identifier information of other communications devices such as second and third communications devices. After receiving the first FTM measurement frame, the first communications device may obtain, according to the first identifier information, the first measurement parameter corresponding to the first communications device, so that FTM measurement can be performed on the first communications device according to the first measurement parameter.

The response device in the measurement method 200 may receive an FTM request frame sent by a communications device, and the FTM request frame is used to request to perform FTM measurement. It should be understood that, the response device may also receive a request frame in another form that is sent by a communications device and that is used to request to perform FTM measurement, or a network system sends, to the response device, indication information used to instruct the communications device and the response device to perform FTM measurement, or an application layer above a MAC layer sends, to the response device, indication information used to instruct the communications device and the response device to perform FTM measurement. That the response device receives the FTM request frame sent by the communications device is only a preferred implementation of this application.

It should be understood that, regardless of whether the measurement method 200 is described from the perspective of the communications device or the measurement method 200 is described from the perspective of the response device, the measurement method essentially describes that the first FTM measurement frame can be sent in a one-to-many manner, instead of sending an FTM measurement frame in a one-to-one manner as in the prior art, so that interaction processes can be reduced to save a channel resource, and FTM measurement can be performed on multiple communications devices at the same time, thereby reducing a measurement time and improving measurement efficiency.

Figure 3:
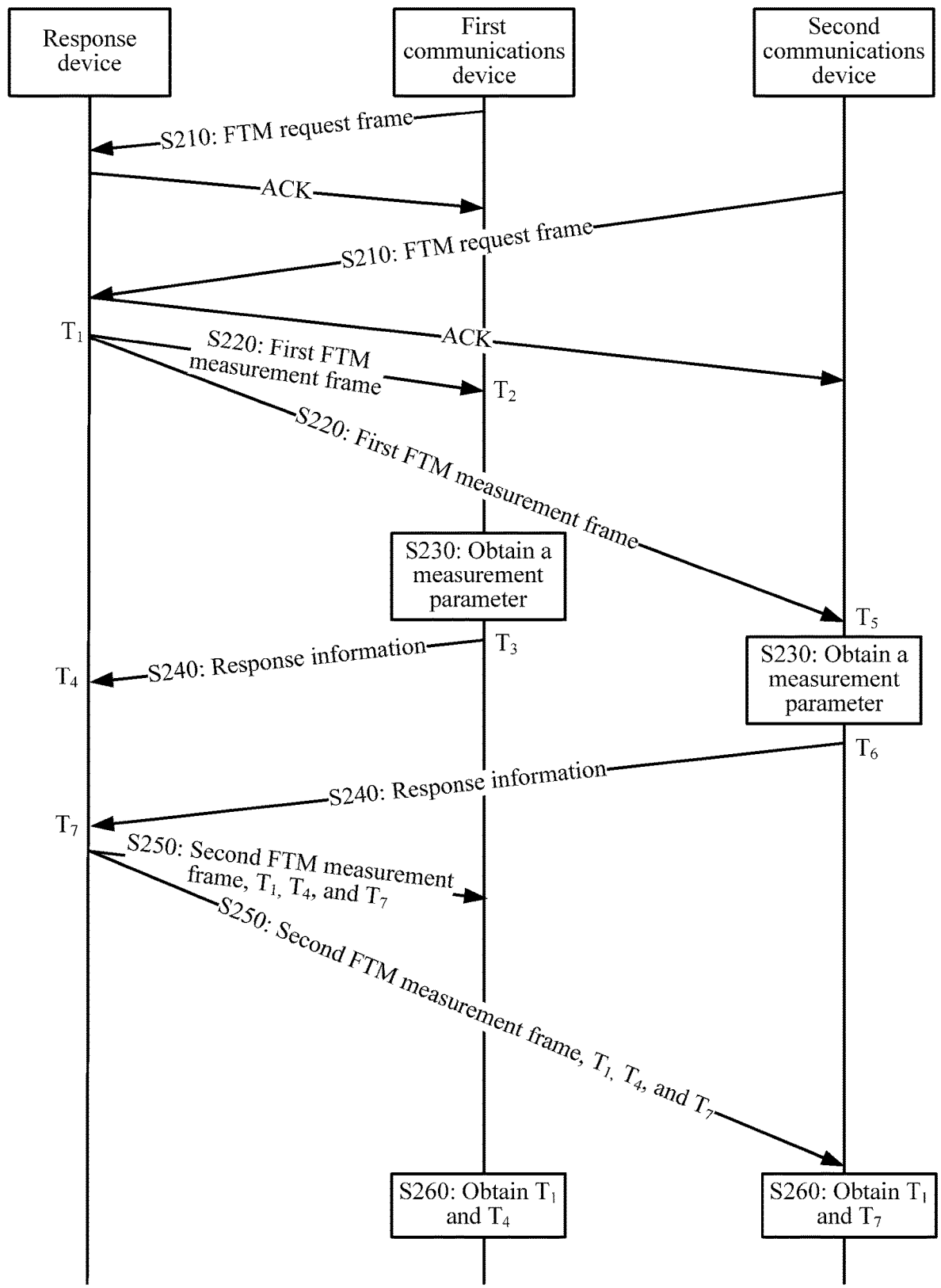
FIG. 3 is another schematic flowchart of a measurement method according to an embodiment of this application.

Optionally, as shown in FIG. 3, the measurement method may further include:

Operation S240: Receive response information that is sent by each of the at least two communications devices according to the first FTM measurement frame to the response device.

Operation S250: The response device sends a second FTM measurement frame, where the second FTM measurement frame includes a sending moment of the first FTM measurement frame, a receiving moment of the response information of each communications device, and the identifier information.

Operation S260: Each communications device obtains a corresponding receiving moment according to the identifier information.

Specifically, the response information may be acknowledgement information ACK (Acknowledgement) or may be other information, such as a NDP, used to perform FTM measurement. In the method, ACK is used as an example. The response device may send the first FTM measurement frame; each communications device may receive the first FTM measurement frame and send ACK to the response device; and the response device receive the ACK sent by each communications device. The response device may broadcast the second FTM measurement frame to each communications device. The second FTM measurement frame includes the sending moment of sending the first FTM measurement frame by the response device, a receiving moment of receiving each piece of acknowledgement information, and the identifier information. After receiving the second FTM measurement frame, each communications device obtains, according to the identifier information, the receiving moment corresponding to each communications device. The receiving moment corresponding to each communications device is a receiving moment of receiving, by the response device, the response information sent by the communications device.

As shown in FIG. 3, using two communications devices as an example, the two communications devices may be a first communications device and a second communications device. The first communications device and the second communications device separately send an FTM request frame to the response device. After receiving the two FTM request frames, the response device may broadcast a first FTM measurement frame, and a moment of sending the first FTM measurement frame by the response device is $T_1$. The first FTM measurement frame may include a first measurement parameter of the first communications device, a second measurement parameter of the second communications device, first identifier information used to indicate the first communications device, and second identifier information used to indicate the second communications device. After receiving the first FTM measurement frame, the first communications device may obtain the first measurement parameter of the first communications device according to the first identifier information. A moment of receiving the first FTM measurement frame by the first communications device is $T_2$. The first communications device sends first ACK to the response device, and a moment of sending the first ACK by the first communications device is $T_3$. The response device receives the first ACK sent by the first communications device, and a moment of receiving the first ACK is $T_4$. After receiving the first FTM measurement frame, the second communications device may obtain the second measurement parameter of the second communications device according to the second identifier information. A moment of receiving the first FTM measurement frame by the second communications device is $T_5$. The second communications device sends second ACK to a response device, and a moment of sending the second ACK by the second communications device is $T_6$. The response device receives the second ACK sent by the first communications device, and a moment of receiving the second ACK is $T_7$. After receiving the first ACK and the second ACK, the response device may broadcast a second FTM measurement frame to the first communications device and the second communications device. The second FTM measurement frame includes the sending moment $T_1$, the receiving moment $T_4$, the receiving moment $T_7$, the first identifier information, and the second identifier information. After receiving the second FTM measurement frame, the first communications device can learn of, by using the first identifier information, the receiving moment $T_4$ corresponding to the first communications device. Similarly, the second communications device can learn of the receiving moment $T_7$ corresponding to the second communications device. The sending moment $T_1$ is used as a common part and is obtained by the first communications device and the second communications device at the same time. It can be learned according to a formula (1) that, by means of the method, a distance between the first communications device and the response device can be obtained; and similarly, a distance between second communications device and the response device can be obtained:

$$d = \frac{(T_4 - T_1) - (T_3 - T_2)}{2} \cdot C \qquad (1)$$

where C is a transmission speed of a radio wave, and usually, $C=3*10^8$ m/s.

It should be understood that, in the measurement method 200, only two communications devices are used as an example. In the measurement method, FTM measurement may be performed on multiple communications devices at the same time.

It should be understood that, in the measurement method 200, each communications device may send at least one FTM measurement request frame to the response device, to ensure that the response device can receive the FTM measurement request sent by the communications device. Similarly, the response device may also broadcast at least one first FTM measurement frame and at least one second FTM measurement frame, to ensure that each communications device can receive the FTM measurement frame that is broadcast by the response device.

It should be understood that, the response device may record the sending moment of sending the first FTM measurement frame and the receiving moment of receiving the ACK, or another timing device may record the corresponding moments. Similarly, the communications device may record the receiving moment of receiving the first FTM measurement frame and the sending moment of sending the ACK, or another timing device may record the corresponding moments. This is not limited in this application herein.

As a result, the response device can broadcast the first FTM measurement frame, instead of sending multiple first FTM measurement frames, so that the first FTM measurement frame is sent in a one-to-many manner. The response device can broadcast the second FTM measurement frame, instead of sending multiple second FTM measurement frames, so that the second FTM measurement frame is sent in a one-to-many manner. Therefore, FTM can be performed on the multiple communications devices at the same time, and interaction processes can further be reduced, thereby improving measurement efficiency.

Optionally, in the measurement method 200, there is a correspondence between a sequence of the identifier information of each communications device and a sequence of sending the response information by each communications device after each communications device receives the first FTM measurement frame.

Specifically, the sequence of the identifier information of each communications device may be a sequence of the identifier information of each communications device in the identifier information of all the communications devices, and a sequence of sending the response information by each communications device after each communications device receives the first FTM measurement frame may be a sequence of sending the response information by each communications device after each communications device receives the first FTM measurement frame. Assuming that sequences of identifier information of three communications devices C1, C2, and C3 in the first FTM measurement frame are sequentially 3, 2, and 1, sequences of feeding back response information by the three communications devices after the three communications devices receive the first FTM measurement frame may be that C3 performs sending first, C2 performs sending second, and C1 performs sending at last; or sequences of sending response information by the three communications devices after the three communications devices receive the first FTM measurement frame may be that C1 performs sending first, C2 performs sending second, and C3 performs sending at last. It should be understood that, in the method 200, the sequence of the identifier information of each communications device and the sequence of sending the response information by each communications device after each communications device receives the first FTM measurement frame may be the same or may be reverse or may be in another correspondence. This is not limited in this application herein.

It should be understood that, the identifier information may be ranked according to MAC addresses, or the identifier information of the communications devices may be ranked according to sequences of receiving the FTM request frames of the communications devices by the response device. How to rank the identifier information is not limited in this application herein.

Optionally, in the measurement method 200, the first FTM measurement frame may include feedback indication information, and the feedback indication information is used to indicate a time interval at which each communications device sends the response information after each communications device receives the first FTM measurement frame.

Specifically, for example, ACK is used as the response information. Assuming that three communications devices are respectively C1, C2, and C3, the three communications devices separately send an FTM request frame to the response device. After receiving the request frames of the three communications devices, the response device may broadcast a first FTM measurement frame to the three communications devices. The first FTM measurement frame includes identifier information of the three communications devices, measurement parameters of the three communications devices, and feedback indication information. After receiving the first FTM measurement frame, the three communications devices may obtain, by using the identifier information, measurement parameters corresponding to the three communications devices, and learn, according to an indication of the feedback indication information, when to send ACK to the response device. A quantity of the feedback indication information corresponds to a quantity of the at least two communications devices, that is, different communications devices correspond to different feedback indication information, so that the communications device obtains, according to the feedback indication information, a moment of sending the response information by the communications device. For example, if first feedback indication information of C1 is 100 us, second feedback indication information of C2 is 200 us, and third feedback indication information of C3 is 350 us, C1 sends ACK to the response device after an interval of 100 us after receiving the first FTM measurement frame; C2 sends ACK to the response device after an interval of 200 us after receiving the first FTM measurement frame; and C3 sends ACK to the response device after an interval of 350 us after receiving the first FTM measurement frame. The three communications devices sequentially send the acknowledgement information to the response device in chronological order, thereby preventing an information transmission failure caused by a transmission collision, and improving measurement efficiency.

Optionally, in the measurement method 200, the first FTM measurement frame includes feedback indication information, and the feedback indication information is used to indicate a time interval at which each communications device feeds back response information after each communications device receives the first FTM measurement frame.

Specifically, assuming that there are three communications devices C1, C2, and C3, the feedback indication information may indicate that intervals at which the three communications devices feed back response information are a fixed value T, that is, the three communications devices share one piece of feedback indication information. Assuming that sequences of sequentially feeding back the response information by the three communications devices are C2, C1, and C3, after the three communications devices receive the first FTM measurement frame, C2 feeds back the response information first, C1 feeds back the response information after a time interval of T after C2 feeds back the response information, and C3 feeds back the response information after a time interval of T after C1 feeds back the response information. That is, C2 may feed back the response information first, C1 may feed back the response information after a time interval of T, and C3 may feed back the response information after a time interval of 2T. Optionally, the at least two communications devices feed back first pieces of response information after a short interframe space SIFS after receiving the first FTM measurement frame. For example, C1 sends the response information after a time of an SIFS after receiving the first FTM measurement frame, C2 feeds back the response information after a time of an SIFS+T after receiving the first FTM measurement frame, and C3 feeds back the response information after a time of an SIFS+2T after receiving the first FTM measurement frame. T may be an SIFS+$T_{ACK}$, the short interframe space SIFS (Short interframe space) may be 16 us, and $T_{ACK}$ is a time of sending or receiving one piece of acknowledgement information and may be 40 us.

Figure 4:
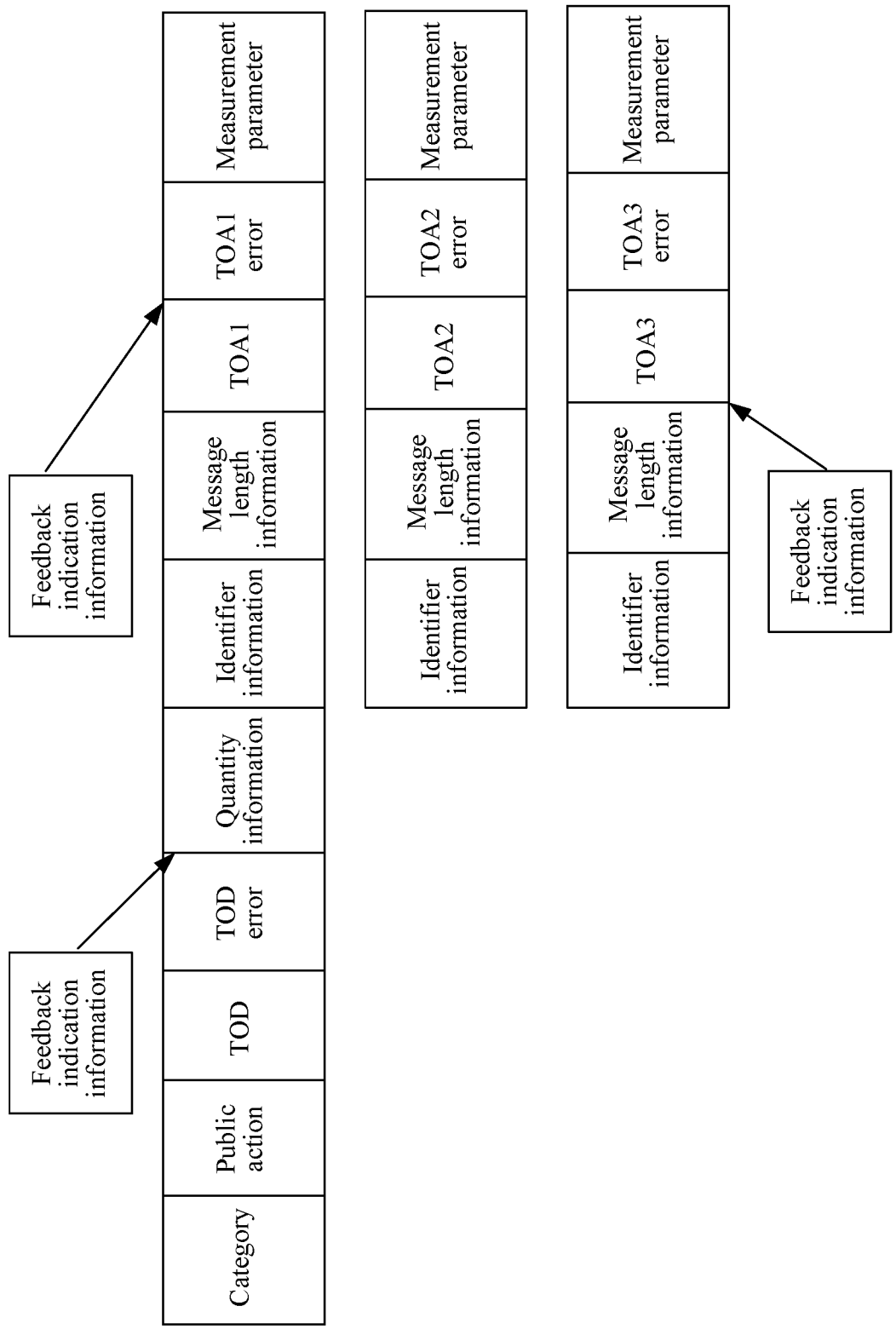
FIG. 4 is a schematic diagram of an action field in an FTM measurement frame according to an embodiment of this application.

FIG. 4 is a schematic diagram of an action field in an FTM measurement frame. In the measurement method 200, the FTM measurement frame shown in FIG. 4 may be a first FTM measurement frame. As shown in FIG. 4, a category field is used to indicate a type of an action frame; a public action field closely follows the category field and is used to distinguish between different public action frame formats; a time of departure TOD is used to carry a sending time; a TOD error is used to indicate time precision; a time of arrival TOA is used to carry a receiving time; a TOA error is used to indicate time precision; and a fine timing measurement parameter field is used to carry an FTM measurement parameter. The first FTM measurement frame may be understood as a measurement frame including public information and dedicated information. The public information is information that can be shared by multiple communications devices, and the dedicated information is dedicated information of each communications device. The dedicated information may include a measurement parameter of each communications device. As shown in FIG. 4, if feedback indication information is separately inserted into the dedicated information, the feedback indication information may indicate an interval at which each communications device feeds back response information after each communications device receives the first FTM measurement frame. If the feedback indication information is inserted into the public information, the feedback indication information is used to indicate a time interval at which each communications device feed back the response information after each communications device receives the first FTM measurement frame. It should be understood that, locations at which the feedback indication information is inserted into dedicated parts may be the same or may be different. This is not limited in this application herein. Similarly, a location at which the feedback indication information is inserted into the public information may be not limited either.

The multiple communications devices may sequentially send the response information to the response device at a corresponding time interval according to the feedback indication information, so that an information transmission failure caused by a transmission collision can be prevented, and the acknowledgement information can be accurately and efficiently fed back to the response device, thereby improving measurement efficiency.

Optionally, in the measurement method 200, at least one of the FTM request frame or the first FTM measurement frame may include function indication information used to indicate that the communications device supports multi-user measurement. That is, the FTM request frame may include the function indication information; or the first FTM measurement frame may include the function indication information; or both the FTM request frame and the first FTM measurement frame include the function indication information.

The function indication information may be carried in the measurement parameter field. FIG. 5 is a schematic diagram of the measurement parameter field (e.g., Fine Timing Measurement Parameters Field Format). As shown in FIG. 5, the measurement parameter field may include a status indication used to indicate a request success or failure; a value used to set a time length; reserved (e.g., Reserved); the number of measurement groups (e.g., Number of bursts exponent) used to indicate a quantity of measurement groups; duration (e.g., Burst Duration): a time that lasts; an FTM interval (e.g., Min Deltan FTM) used to indicate a time interval between two consecutive FTM measurement frames; partial timing (e.g., Partial TSF timer) used to indicate a time of sending a first FTM measurement frame by a response device after the response device receives an FTM request; a function indication (e.g., ASAP capable) used to indicate whether a time stamp of the first FTM measurement frame can be obtained and fed back in a subsequent FTM frame; ASAP used to indicate whether FTM measurement is expected to start as soon as possible; a quantity of times (e.g., FTMs per burst) used to indicate a quantity of times of performing FTM measurement during measurement on one group; an FTM format and bandwidth used to indicate an FTM frame type and an occupied bandwidth (for example, the type is an 11n type or an 11ac type, and the bandwidth is 20 M, or 40 M, or 80 M); and a measurement group period (e.g., Burst period) used to indicate duration of a measurement group (burst).

The response device or the communications device can learn, by using the function indication information, whether the opposite party can perform a many-to-one measurement operation, thereby preventing the response device from blindly sending the first FTM measurement frame or preventing the communications device from blindly sending the FTM request frame.

Optionally, in the measurement method 200, the FTM measurement frame shown in FIG. 4 may be a first FTM measurement frame. As shown in FIG. 4, the first FTM measurement frame may further include at least one of quantity information or message length information. The quantity information is used to indicate a quantity of the at least two communications devices; and the message length information is used to indicate a length occupied by each of time information and parameter information of each communications device, or the message length information is used to indicate a length occupied by time information or other information of each communications device.

Each communications device can learn of the specific quantity of the at least two communications devices by using the quantity information, so that each communications device can estimate, according to the quantity information with reference to a factor such as a sending sequence of each communications device or a time interval, a time of performing FTM measurement by each communications device and estimate a waiting time for measurement, so as to prevent the communications device from blindly sending the response information to cause an information sending failure or from blindly waiting for measurement, thereby improving measurement efficiency. Each communications device can more rapidly find, by using the message length information, information (the time information or the measurement parameter) required by each communications device, thereby improving measurement efficiency.

In the foregoing descriptions, the multiple communications devices sends the FTM request frames to the response device, and the response device may broadcast at least one of the first FTM measurement frame or the second FTM measurement frame to multiple communications devices, so as to measure the multiple communications devices at the same time. However, in an actual application scenario, before sending the second FTM measurement frame to the communications device, the response device may receive an FTM request frame sent by another communications device. A measurement method in this scenario is specifically described below.

Figure 6:
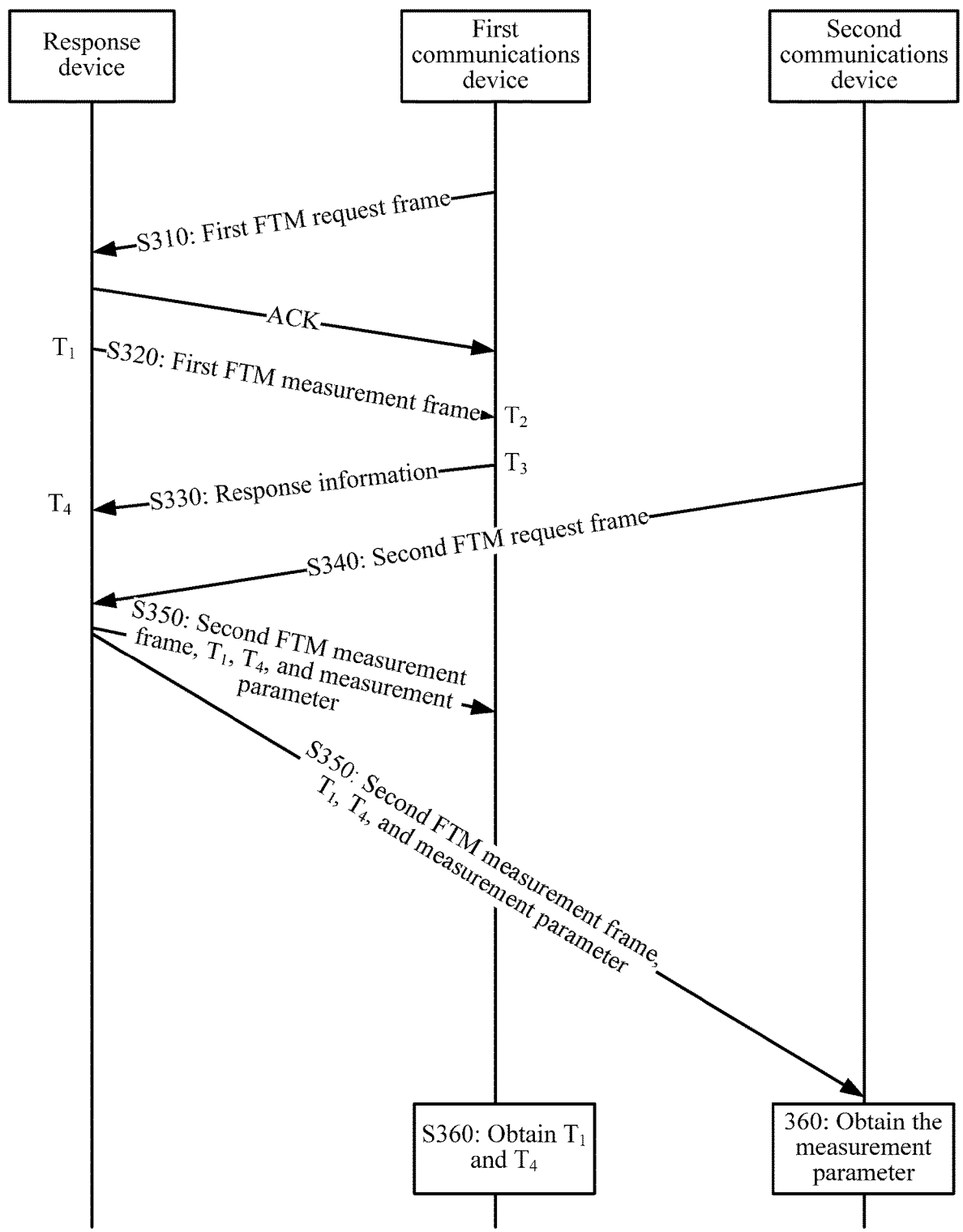
FIG. 6 is a schematic flowchart of a measurement method according to another embodiment of this application.

FIG. 6 is a schematic flowchart of a measurement method according to another embodiment of this application. As shown in FIG. 6, the measurement method may include the following operations:

Operation S310: At least one first communications device sends a first FTM request frame to a response device.

Operation S320: The response device sends a first FTM measurement frame according to the first FTM request frame.

Operation S330: The at least one first communications device sends response information to the response device.

Operation S340: At least one second communications device sends a second FTM request frame to the response device.

Operation S350: The response device sends a second FTM measurement frame, where the second FTM measurement frame includes first identifier information used to indicate the first communications device, a sending moment of sending the first FTM measurement frame by the response device, a receiving moment of receiving, by the response device, response information sent by each of the at least one first communications device, second identifier information used to indicate each of the at least one second communications device, and a measurement parameter of each second communications device.

Operation S360: Each first communications device obtains a corresponding receiving moment according to the first identifier information, and each second communications device obtains the corresponding measurement parameter according to the second identifier information.

Specifically, the response information may be acknowledgement information ACK (Acknowledgement) or may be a NDP. In the method, ACK is used as an example. The at least one first communications device may send the first FTM request frame to the response device. After receiving the first FTM request frame, the response device may send the first FTM measurement frame according to the first FTM request frame. After receiving the first FTM measurement frame, the at least one first communications device may separately send ACK to the response device. The response device receives the ACK. After the response device sends the first FTM measurement frame and before the response device sends the second FTM measurement frame, the response device may receive the second FTM request frame sent by the at least one second communications device. In this case, the response device may broadcast one second FTM measurement frame to the at least one first communications device and the at least one second communications device. The second FTM measurement frame may include the first identifier information used to indicate each of the at least one first communications device, the sending moment of sending the first FTM measurement frame by the response device, a receiving moment of receiving, by the response device, the ACK sent by each first communications device, the measurement parameter of each of the at least one second communications device, and the second identifier information used to indicate each second communications device. Each first communications device obtains, according to the first identifier information, time information (the sending moment and the receiving moment) corresponding to each first communications device, and each second communications device obtains, according to the second identifier information, the measurement parameter corresponding to each second communications device. The corresponding receiving moment obtained by the first communications device is the receiving moment of receiving, by the response device, the ACK sent by first communications device. Optionally, both the first identifier information and the second identifier information may include a MAC address or an AID. The first identifier information may be a MAC address of the first communications device or an AID of the first communications device; and the second identifier information may be a MAC address of the second communications device or an AID of the second communications device.

It should be understood that, if there are multiple first communications devices, the sending moment of sending the first FTM measurement frame by the response device is used as public information and obtained by all of the multiple first communications devices. Therefore, the first communications device obtains, according to the first identifier information, the receiving moment corresponding to the first communications device.

As shown in FIG. 6, one first communications device and one second communications device are used as an example. The first communications device may send a first FTM request frame to the response device. After receiving the first FTM request frame, the response device may send a first FTM measurement frame to the first communications device, and a moment of sending the first FTM measurement frame by the response device is $T_1$. After receiving the first FTM measurement frame, the first communications device sends ACK to the response device, a moment of receiving the first FTM measurement frame by the communications device is $T_2$, and a moment of sending the ACK by the first communications device is $T_3$. The response device receives the ACK, and a moment of receiving the ACK by the response device is $T_4$. After sending the first FTM measurement frame and before sending a second FTM measurement frame, the response device receives a second FTM request frame sent by the second communications device. After receiving the second FTM request frame, the response device may broadcast the second FTM measurement frame to the first communications device and the second communications device. The second FTM measurement frame includes the sending moment $T_1$, the receiving moment $T_4$, first identifier information used to indicate the first communications device, a measurement parameter of the second communications device, and second identifier information used to indicate the second communications device. After receiving the second FTM measurement frame, the first communications device can learn of the sending moment $T_1$ and the receiving moment $T_4$ according to the first identifier information; and the second communications device may obtain the measurement parameter according to the second identifier information, to perform FTM.

The second FTM measurement frame is received, so that the first communications device can learn of time information (that is, the sending moment $T_1$ and the receiving moment $T_4$) corresponding to the first communications device, and further the second communications device can learn of the measurement parameter corresponding to the second communications device. By sending one second FTM measurement frame, the response device can enable the first communications device and the second communications device to obtain respective required information, and does not need to send multiple FTM measurement frames as in the prior art. Therefore, interaction processes can be reduced to save a channel resource, and FTM measurement can be performed on multiple communications devices at the same time, thereby reducing a measurement time and improving measurement efficiency.

It should be understood that, in the measurement method 300, the response device may first receive a first FTM request frame of one first communications device, and then receive a second FTM request frame of one second communications device; or the response device may first receive a first FTM request frame of one first communications device, and then receive second FTM request frames of multiple second communications devices; or the response device may first receive first FTM request frames of multiple first communications devices, and then receive a second FTM request frame of one second communications device; or the response device may first receive first FTM request frames of multiple first communications devices, and then receive second FTM request frames of multiple second communications devices. This is not limited in this application herein.

It should be understood that, the FTM measurement frame of the response device includes the identifier information of the multiple communications devices, so that the multiple communications devices obtain corresponding information, or after receiving the FTM measurement frame, the communications device determines, according to the identifier information of the communications device, information that needs to be obtained by the communications device. In both manners, the method provided in this embodiment of this application can be used to perform FTM.

Optionally, in the method 300, the first FTM measurement frame may include a measurement parameter of each of the at least one first communications device and the first identifier information used to indicate each first communications device, so that each first communications device obtains, according to the first identifier information, the measurement parameter corresponding to each first communications device.

Specifically, if the response device receives only a first FTM request frame sent by one first communications device, the response device may send the first FTM measurement frame to the first communications device in a unicast manner or a broadcast manner. If the response device receives multiple first FTM request frames sent by multiple first communications devices, the response device may directly broadcast the first FTM measurement frame. In this case, the first FTM measurement frame may include a measurement parameter of each of the multiple first communications devices and first identifier information, or the first FTM measurement frame may include neither the measurement parameter nor the first identifier information. Alternatively, the response device may send the first FTM measurement frame to the multiple first communications devices one to one as in the prior art. This is not limited in this application herein.

Optionally, in the measurement method 300, there is a correspondence between a sequence of the second identifier information of each of the at least one second communications device and a sequence of feeding back the response information by each second communications device after each second communications device receives the second FTM measurement frame.

Specifically, assuming that sequences of second identifier information of three second communications devices C1, C2, and C3 in the second FTM measurement frame are sequentially 3, 2, and 1, sequences of feeding back response information by the three second communications devices after the three second communications devices receive the second FTM measurement frame may be that C3 performs sending first, C2 performs sending second, and C1 performs sending at last, or sequences of feeding back response information by the three second communications devices after the three second communications devices receive the second FTM measurement frame may be that C1 performs sending first, C2 performs sending second, and C3 performs sending at last.

It should be understood that, in this application, the sequence of the identifier information of each second communications device and the sequence of feeding back the response information by each second communications device after each second communications device receives the second FTM measurement frame may be the same or may be reverse or in another correspondence. This is not limited in this application herein.

It should be understood that, the second identifier information may be ranked according to MAC addresses, or the identifier information of the communications devices may be ranked according to sequences of receiving the FTM request frames of the second communications devices by the response device. How to rank the identifier information is not limited in this application herein.

It should be understood that, in this application, for a sending moment and a receiving moment, the moments should be limited according to a specific sending object and receiving object.

Optionally, in the measurement method 300, the second FTM measurement frame may include feedback indication information, and the feedback indication information is used to indicate a time interval at which each of the at least one second communications device feeds back the response information after each of the at least one second communications device receives the second FTM measurement frame.

Specifically, for example, ACK is used as the response information. Assuming that three second communications devices are respectively C1, C2, and C3, the three communications devices separately send a second FTM request frame to the response device. After receiving the second FTM request frames of the three communications devices, the response device broadcasts a second FTM measurement frame. The second FTM measurement frame includes the first identifier information used to indicate each first communications device, a sending moment of sending the first FTM measurement frame by the response device, a receiving moment of receiving ACK of each first communications device by the response device, respective measurement parameters of the three second communications devices, second identifier information used to indicate the three second communications devices, and feedback indication information. After receiving the second FTM measurement frame, the three second communications devices may separately obtain a corresponding measurement parameter by using the second identifier information, and learn, according to an indication of the feedback indication information, when to send the ACK to the response device. For example, if first feedback indication information of C1 is 100 us, second feedback indication information of C2 is 200 us, and third feedback indication information of C3 is 350 us, C1 sends ACK to the response device after an interval of 100 us after receiving the second FTM measurement frame; C2 sends ACK to the response device after an interval of 200 us after receiving the second FTM measurement frame; and C3 sends ACK to the response device after an interval of 350 us after receiving the second FTM measurement frame. The three second communications devices sequentially send the acknowledgement information to the response device in chronological order, thereby preventing an information transmission failure caused by a transmission collision, and improving measurement efficiency.

Optionally, in the measurement method 300, the second FTM measurement frame includes feedback indication information, and the feedback indication information is used to indicate a time interval at which each second communications device feeds back the response information after each second communications device receives the second FTM measurement frame.

Specifically, assuming that there are three second communications devices C1, C2, and C3, the feedback indication information may indicate that intervals at which the three second communications devices feed back response information are a fixed value T, and assuming that sequences of sequentially feeding back the response information by the three second communications devices are C2, C1, and C3, after the three communications devices receive the first FTM measurement frame, C2 feeds back the response information first, C1 feeds back the response information after an interval of T after C2 feeds back the response information, and C3 feeds back the response information after an interval of T after C1 feeds back the response information. Optionally, the at least two second communications devices feed back first pieces of response information after a short interframe space SIFS after receiving the second FTM measurement frame. For example, C1 sends the response information after a time of an SIFS after receiving the first FTM measurement frame, C2 feeds back the response information after a time of an SIFS+T after receiving the second FTM measurement frame, and C3 feeds back the response information after a time of an SIFS+2T after receiving the second FTM measurement frame. T may be an SIFS+$T_{ACK}$, the short interframe space SIFS may be 16 us, and $T_{ACK}$ is a time of sending or receiving one piece of acknowledgement information and may be 40 us.

FIG. 4 is a schematic diagram of an action field in an FTM measurement frame. In the measurement method 300, the FTM measurement frame shown in FIG. 4 may be a second FTM measurement frame. As shown in FIG. 4, a category field (Category) is used to indicate a type of an action frame; a public action field closely follows the category field and is used to distinguish between different public action frame formats; a time of departure (TOD) is used to carry a sending time of the first FTM measurement frame; a TOD error is used to indicate time precision; a time of arrival (TOA) is used to carry a time of receiving each piece of acknowledgement information by the response device; a TOA error is used to indicate time precision; and a fine timing measurement parameter field is used to carry an FTM measurement parameter. Optionally, the second FTM measurement frame may be understood as including public information and dedicated information. The public information is information that can be shared by multiple communications devices, and the dedicated information is dedicated information of each communications device. The dedicated information may include time information (for example, the sending moment of sending the FTM measurement frame and the receiving moment of receiving the response information) and the identifier information of the first communications device, and the measurement parameter and the identifier information of the second communications device. If the feedback indication information is separately inserted into the dedicated information, the feedback indication information may indicate an interval at which each second communications device feeds back the response information after each second communications device receives the second FTM measurement frame. If the feedback indication information is inserted into the public information, the feedback indication information is used to indicate a time interval at which each second communications device feeds back the response information after each second communications device receives the second FTM measurement frame. It should be understood that, locations at which the feedback indication information is inserted into dedicated parts may be the same or may be different. This is not limited in this application herein. Similarly, a location at which the feedback indication information is inserted into the public information may be not limited either.

The multiple second communications devices may sequentially send the response information to the response device at a fixed time interval or at a determined moment according to an indication of the feedback indication information, so that an information transmission failure caused by a transmission collision can be prevented, and the acknowledgement information can be accurately and efficiently fed back to the response device, thereby improving measurement efficiency.

Optionally, at least one of the first FTM request frame, the second FTM request frame, the first FTM measurement frame, or the second FTM measurement frame may include function indication information used to indicate that the communications device supports multi-user measurement.

The response device or the communications device can learn, by using the function indication information, whether the opposite party can perform a many-to-one measurement operation, thereby preventing the response device from blindly sending the corresponding FTM measurement frame or preventing the communications device from blindly sending the FTM request frame.

Optionally, the second FTM measurement frame further includes at least one of quantity information or message length information. The quantity information is used to indicate a sum of a quantity of the first communications devices and a quantity of the second communications devices; and the message length information is used to indicate a length occupied by each of time information and parameter information of each first communications device and each second communications device.

Each second communications device can learn of the sum of the quantity of the first communications devices and the quantity of the second communications devices by using the quantity information, so that each second communications device can estimate, according to the quantity information with reference to a factor such as a sending sequence of each second communications device or a time interval, duration of performing FTM measurement, and if the second communications device estimates that the second communications device needs to wait for a very long time, may send a request again to perform FTM measurement with another response device, or does not perform FTM currently. Each second communications device can estimate a moment of feeding back the response information by each second communications device, so as to prevent the communications device from blindly feeding back the acknowledgement information, thereby improving measurement efficiency. Each first communications device can more conveniently find the time information of each first communications device by using the message length information, so that each second communications device can more rapidly find the measurement parameter of each second communications device, thereby improving measurement efficiency.

Figure 7:
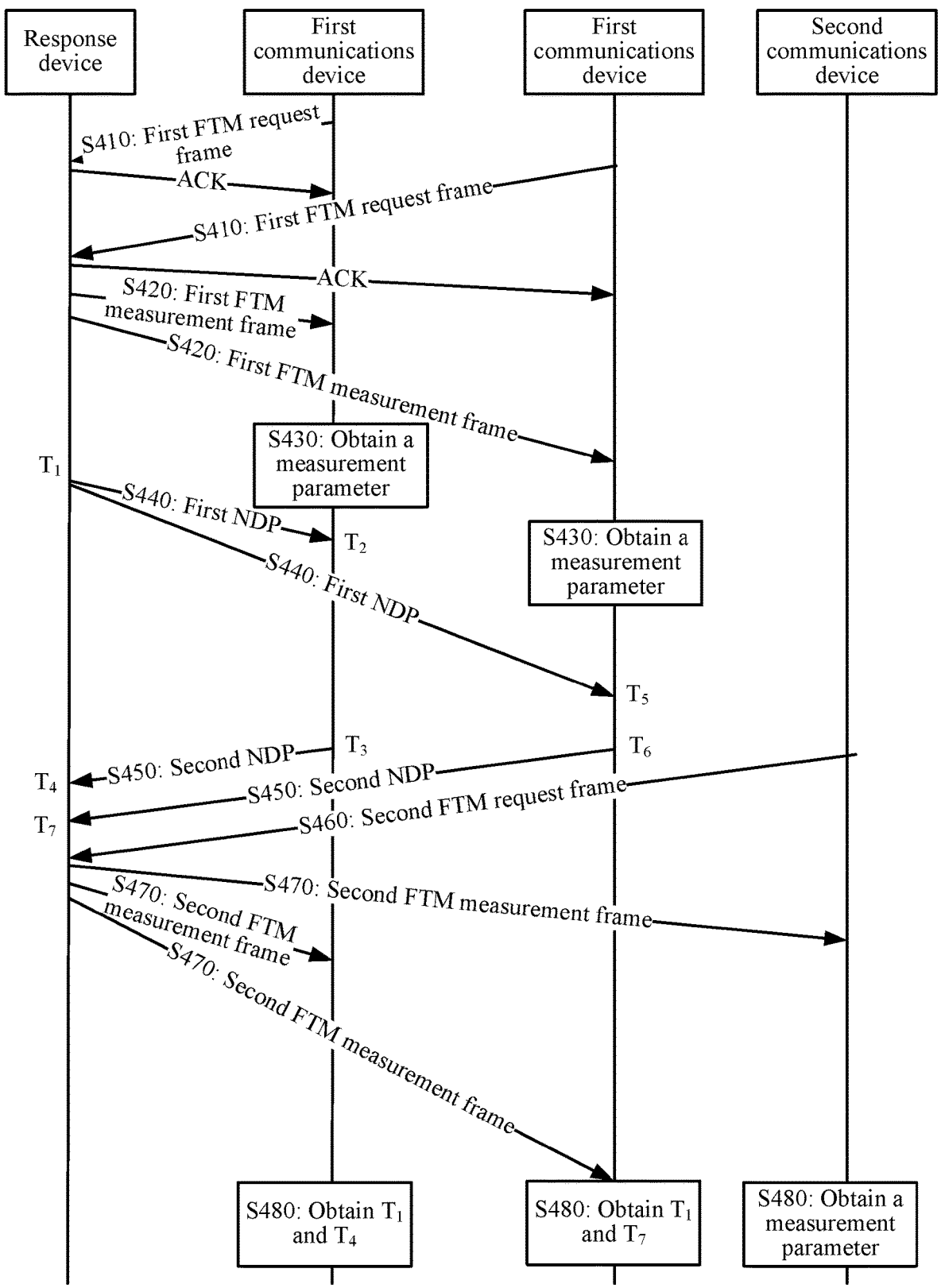
FIG. 7 is a schematic flowchart of a measurement method according to still another embodiment of this application.

The foregoing mainly describes that the time information is obtained by exchanging the acknowledgement information. To improve measurement precision, the measurement precision can be improved by exchanging NDPs. As shown in FIG. 7, Operation S410: At least one first communications device sends a first FTM request frame to a response device.

Operation S420: The response device sends a first FTM measurement frame according to the first FTM request frame, where the first FTM measurement frame includes a measurement parameter of each of the at least one first communications device and identifier information used to indicate each first communications device.

Operation S430: Each first communications device obtains, according to the identifier information, a measurement parameter corresponding to each first communications device.

Operation S440: The response device broadcasts a first NDP to the at least one first communications device.

Operation S450: After receiving the first NDP, the at least one first communications device sends a second NDP to the response device.

Operation S460: At least one second communications device sends a second FTM request frame to the response device.

Operation S470: The response device sends a second FTM measurement frame, where the second FTM measurement frame includes first identifier information used to indicate each first communications device, a sending moment of sending the first NDP by the response device, a receiving moment of receiving at least one second NDP by the response device, a measurement parameter of each of the at least one second communications device, and second identifier information used to indicate each second communications device.

Operation S480: Each first communications device obtains, according to the first identifier information, a receiving moment corresponding to each first communications device; and each second communications device obtains, according to the second identifier information, the measurement parameter corresponding to each second communications device.

Specifically, two first communications devices and one second communications device are used as an example. The response device may receive first FTM request frames sent by the two first communications devices, and broadcast a first FTM measurement frame according to the first FTM request frame, so that the two first communications devices respectively learn of measurement parameters of the two first communications devices. After sending the first FTM measurement frame, the response device broadcasts a first NDP, and a sending moment of sending the first FTM measurement frame by the response device is $T_1$. The two first communications devices receive the first NDP, and moments of receiving the first NDP by the two first communications devices are respectively $T_2$ and $T_5$. The two first communications devices separately send a second NDP to the response device, and moments of sending the second NDPs by the two first communications devices are respectively $T_3$ and $T_6$. The second communications device sends a second FTM request frame to the response device. After receiving the second FTM request frame and the two second NDPs, the response device may broadcast a second FTM measurement frame to the two first communications devices and the second communications device. The second FTM measurement frame includes the sending moment $T_1$ of sending the first NDP by the response device, receiving moments $T_4$ and $T_7$ of respectively receiving the two second NDPs by the response device, respective first identifier information of the two first communications devices, a measurement parameter of the second communications device, and second identifier information used to indicate the second communications device. After receiving the second FTM measurement frame, the two first communications devices may obtain, according to the respective first identifier information, the sending moment of sending the first FTM measurement frame by the response device, and the receiving moments ($T_1$, $T_4$) of receiving, by the response device, the second NDPs sent by the two first communications devices. The first communications device may obtain a distance between the first communications device and the response device with reference to the sending moment, the receiving moment of receiving the second NDP of the first communications device by the response device, and a receiving moment of receiving the first FTM measurement frame and the sending moment of sending the second NDP that are recorded by the first communications device. In addition, after receiving the second FTM measurement frame, the second communications device may obtain the measurement parameter according to the second identifier information of the second communications device, to perform FTM. Optionally, both the first identifier information and the second identifier information may include a MAC address or an AID. The first identifier information may be a MAC address of the first communications device or an AID of the first communications device; and the second identifier information may be a MAC address of the second communications device or an AID of the first communications device.

Optionally, the first FTM measurement frame may include feedback indication information, and the second FTM measurement frame may also include feedback indication information. In the first FTM measurement frame, the feedback indication information is used to indicate a time interval at which each first communications device sends the second NDP after each first communications device receives the first NDP. In the second FTM measurement frame, the feedback indication information is used to indicate a time interval at which each second communications device sends response information after each second communications device receives the second FTM measurement frame.

Optionally, in the first FTM measurement frame, there is a correspondence between a sequence of the first identifier information of each first communications device and a sequence of sending the second NDP by each first communications device after each first communications device receives the first NDP. In the second FTM measurement frame, there is a correspondence between a sequence of the second identifier information of each second communications device and a sequence of sending the response information by each second communications device after each second communications device receives the second FTM measurement frame.

Optionally, the first FTM measurement frame includes feedback indication information, and the feedback indication information is used to indicate a time interval at which each communications device feeds back response information after each first communications device receives the first FTM measurement frame.

Optionally, at least one of the first FTM request frame, the second FTM request frame, the first FTM measurement frame, or the second FTM measurement frame may include function indication information used to indicate that the communications device supports multi-user measurement.

The response device or the communications device can learn, by using the function indication information, whether the opposite party can perform a many-to-one measurement operation, thereby preventing the response device from blindly sending the corresponding FTM measurement frame or preventing the communications device from blindly sending the FTM request frame.

Optionally, the second FTM measurement frame further includes at least one of quantity information or message length information. The quantity information is used to indicate a sum of a quantity of the first communications devices and a quantity of the second communications devices; and the message length information is used to indicate a length occupied by each of time information and parameter information of each first communications device and each second communications device.

The response device may send one first FTM measurement frame instead of multiple first FTM measurement frames, send one second FTM measurement frame instead of multiple second FTM measurement frames, so that interaction processes can be reduced to improve measurement efficiency, and corresponding time information is obtained by exchanging NDPs to improve measurement precision, thereby improving measurement accuracy.

The FTM method is described above, and correspondingly, a communications device using the method to perform measurement is described below.

Figure 8:
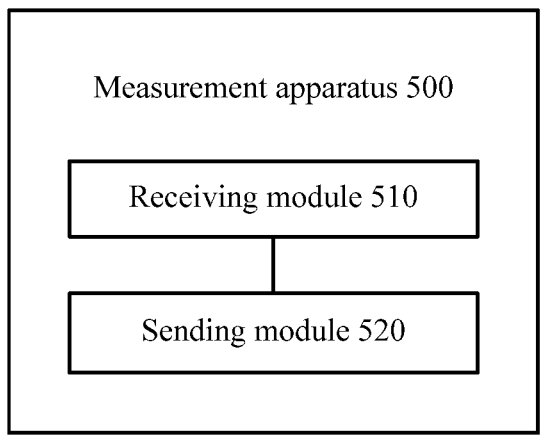
FIG. 8 is a schematic structural block diagram of a communications device according to an embodiment of this application.

As shown in FIG. 8, an embodiment of this application provides a communications device 500. Generally, a terminal having a Wi-Fi function such as a smart terminal or an access point AP may be used as the measurement apparatus 500. The communications device 500 may include:

a receiving module 510, configured to receive fine timing measurement FTM request frames sent by at least two communications stations; and a sending module 520, configured to send a first FTM measurement frame according to the FTM request frame, where the first FTM measurement frame includes a measurement parameter of each of the at least two communications stations and identifier information used to indicate each communications station, so that each communications station obtains the measurement parameter according to the identifier information.

Optionally, the first FTM measurement frame includes feedback indication information, and the feedback indication information is used to indicate a time interval at which each communications station sends response information after each communications station receives the first FTM measurement frame.

Optionally, the receiving module 510 is further configured to receive the response information that is sent by each communications station according to the first FTM measurement frame. The sending module 520 is further configured to send a second FTM measurement frame to the at least two communications stations, where the second FTM measurement frame includes a sending moment of sending the first FTM measurement frame by the communications device, a receiving moment of the response information sent by each communications station, and the identifier information, so that each communications station obtains a corresponding receiving moment according to the identifier information.

Optionally, there is a correspondence between a sequence of the identifier information of each communications station and a sequence of sending the response information by each communications station after each communications station receives the first FTM measurement frame.

Optionally, the identifier information includes a MAC address or an AID.

Optionally, at least one of the FTM request frame or the first FTM measurement frame may include function indication information used to indicate that the communications station or the communications device supports multi-user measurement.

Optionally, the first FTM measurement frame sent by the sending module 520 may further include at least one of quantity information or message length information. The quantity information is used to indicate a quantity of the at least two communications stations; and the message length information is used to indicate a length occupied by each of time information and parameter information of each communications station, or the message length information is used to indicate a length occupied by time information or other information of each communications device.

It should be understood that, the communications device 500 according to this embodiment of this application may correspond to the execution body of the method in the embodiments of this application, and the foregoing and other operations and/or functions of the modules in the apparatus 500 are respectively for implementing corresponding procedures in the methods in FIG. 2 to FIG. 7. For brevity, details are not described herein again.

Figure 9:
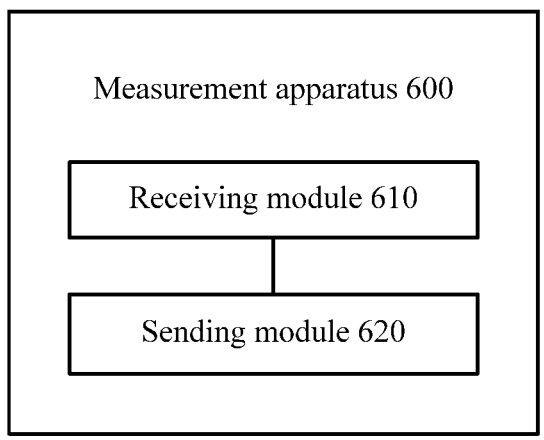
FIG. 9 is a schematic structural block diagram of a communications device according to another embodiment of this application.

As shown in FIG. 9, another embodiment of this application provides a communications device 600. The communications device includes:

a receiving module 610, configured to receive a first FTM request frame sent by at least one first communications device; and a sending module 620, configured to send a first FTM measurement frame according to the first FTM request frame received by the receiving module.

The receiving module 610 is further configured to receive response information that is sent by each of the at least one first communications device according to the first FTM measurement frame. The receiving module is further configured to receive a second FTM request frame sent by at least one second communications device. The sending module is further configured to send a second FTM measurement frame, where the second FTM measurement frame includes first identifier information used to indicate each first communications device, a sending moment of sending the first FTM measurement frame by the response device, a receiving moment of the response information sent by each first communications device, a measurement parameter of each of the at least one second communications device, and second identifier information used to indicate each second communications device, so that each first communications device obtains a corresponding receiving moment according to the first identifier information, and each second communications device obtains the measurement parameter according to the second identifier information.

Optionally, the first FTM measurement frame includes a measurement parameter of each first communications device and the first identifier information, so that the first communications device obtains the measurement parameter of the first communications device according to the first identifier information.

Optionally, the second FTM measurement frame includes feedback indication information, and the feedback indication information is used to indicate a time interval at which each second communications device sends response information after each second communications device receives the second FTM measurement frame.

Optionally, there is a correspondence between a sequence of the second identifier information of each second communications device and a sequence of sending the response information by each second communications device after each second communications device receives the second FTM measurement frame.

Optionally, both the first identifier information and the second identifier information include a MAC address or an AID.

Optionally, the second FTM measurement frame includes feedback indication information, and the feedback indication information is used to indicate a time interval at which each second communications device feeds back the response information after each second communications device receives the first FTM measurement frame.

Optionally, at least one of the FTM request frame, the first FTM measurement frame, or the second FTM measurement frame may include function indication information used to indicate that the communications device supports multi-user measurement.

Optionally, the second FTM measurement frame further includes at least one of quantity information or message length information. The quantity information is used to indicate a sum of a quantity of the first communications devices and a quantity of the second communications devices; and the message length information is used to indicate a length occupied by each of time information and parameter information of each communications device, or the message length information is used to indicate a length occupied by time information or other information of each communications device.

It should be understood that, the communications device 600 according to this embodiment of this application may correspond to the execution body of the method in the embodiments of this application, and the foregoing and other operations and/or functions of the modules in the apparatus 600 are respectively for implementing corresponding procedures in the methods in FIG. 2 to FIG. 7. For brevity, details are not described herein again.

Figure 10:
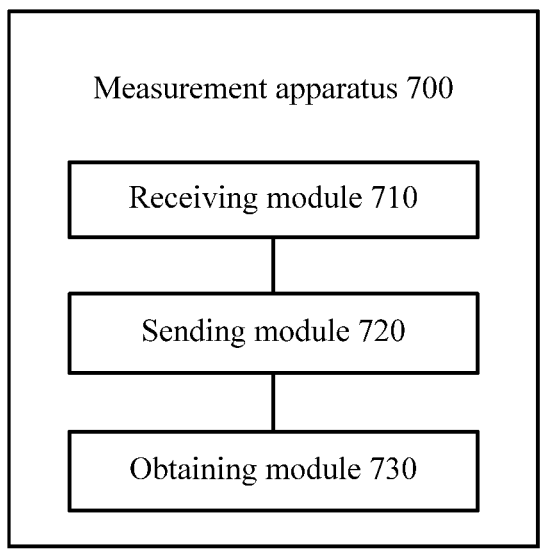
FIG. 10 is a schematic structural block diagram of a communications device according to still another embodiment of this application.

As shown in FIG. 10, still another embodiment of this application provides a communications device 700. The communications device 700 includes:

a sending module 710, configured to send a fine timing measurement FTM request frame to a response device;

a receiving module 720, configured to receive a first FTM measurement frame that is sent by the response device according to the FTM request frame, where the first FTM measurement frame includes a measurement parameter of each of at least two devices and identifier information used to indicate each device; and an obtaining module 730, configured to obtain the measurement parameter of the communications device in the at least two devices according to the identifier information.

Optionally, the first FTM measurement frame includes feedback indication information, and the feedback indication information is used to indicate a time interval at which the communications device sends response information after the communications device receives the first FTM measurement frame.

Optionally, the sending module 710 is further configured to send the response information to the response device according to the first FTM measurement frame received by the receiving module. The receiving module is further configured to receive a second FTM measurement frame sent by the response device, where the second FTM measurement frame includes a sending moment of sending the first FTM measurement frame by the response device, a receiving moment of receiving the response information of each device by the response device, and the identifier information.

The obtaining module 730 is further configured to obtain, according to the identifier information, a receiving moment corresponding to the communications device.

Optionally, there is a correspondence between a sequence of the identifier information of the communications device in the identifier information of the at least two devices and a sequence, of sending the response information by the communications device after the communications device receives the first FTM measurement frame, in sending the response information by the at least two devices after the at least two devices receive the first FTM measurement frame.

Optionally, the identifier information includes a MAC address or an AID.

Optionally, the first FTM measurement frame includes feedback indication information, and the feedback indication information is used to indicate a time interval at which each device feeds back the response information after each device receives the first FTM measurement frame.

Optionally, the FTM request frame and the first FTM measurement frame include function indication information used to indicate that the communications device supports multi-user measurement.

Optionally, the first FTM measurement frame further includes at least one of quantity information or message length information. The quantity information is used to indicate a quantity of the at least two devices; and the message length information is used to indicate a length occupied by each of time information and parameter information of each device, or the message length information is used to indicate a length occupied by time information or other information of each device.

It should be understood that, the communications device 700 according to this embodiment of this application may correspond to the execution body of the method in the embodiments of this application, and the foregoing and other operations and/or functions of the modules in the apparatus 700 are respectively for implementing corresponding procedures in the methods in FIG. 2 to FIG. 7. For brevity, details are not described herein again.

Figure 11:
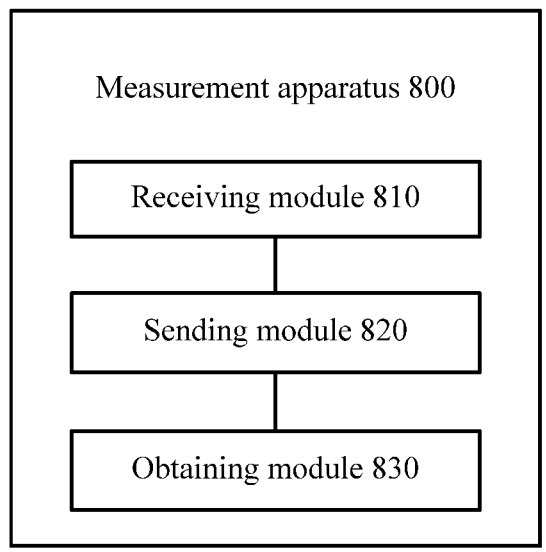
FIG. 11 is a schematic structural block diagram of a communications device according to yet another embodiment of this application.

As shown in FIG. 11, yet another embodiment of this application provides a communications device 800. The communications device 800 includes:

a sending module 810, configured to send a first fine timing measurement FTM request frame to a response device;

a receiving module 820, configured to receive a first FTM measurement frame that is sent by the response device according to the first FTM request frame, where the sending module 810 is further configured to send response information to the response device; and the receiving module is further configured to receive a second FTM measurement frame sent by the response device, where the second FTM measurement frame includes first identifier information used to indicate the communications device, a sending moment of sending the first FTM measurement frame by the response device, a receiving moment of receiving the response information of the communications device by the response device, a measurement parameter of each of at least one first communications device, and second identifier information used to indicate each first communications device; and an obtaining module 830, configured to obtain, according to the first identifier information, a receiving moment corresponding to the communications device.

Optionally, the first FTM measurement frame includes a measurement parameter of the communications device and the first identifier information; and the obtaining module is further configured to obtain the measurement parameter of the communications device according to the first identifier information.

Optionally, the second FTM measurement frame includes feedback indication information, and the feedback indication information is used to indicate a time interval at which each first communications device sends response information after each first communications device receives the second FTM measurement frame.

Optionally, there is a correspondence between a sequence of the second identifier information of each first communications device and a sequence of sending the response information by each first communications device after each first communications device receives the second FTM measurement frame.

Optionally, the first identifier information and the second identifier information include a MAC address or an AID.

Optionally, at least one of the first FTM request frame, the second FTM request frame, the first FTM measurement frame, or the second FTM measurement frame includes function indication information used to indicate that the communications device supports multi-user measurement.

Optionally, the second FTM measurement frame further includes at least one of quantity information or message length information. The quantity information is used to indicate a sum of a quantity of the communications devices and a quantity of the first communications devices; and the message length information is used to indicate a length occupied by each of time information and parameter information of the communications device and each first communications device.

It should be understood that, the communications device 800 according to this embodiment of this application may correspond to the execution body of the method in the embodiments of this application, and the foregoing and other operations and/or functions of the modules in the apparatus 800 are respectively for implementing corresponding procedures in the methods in FIG. 2 to FIG. 7. For brevity, details are not described herein again.

The communications device is described from the perspective of functions modules in FIG. 8 to FIG. 11, and the communications device is described from the perspective of a physical apparatus below.

Figure 12:
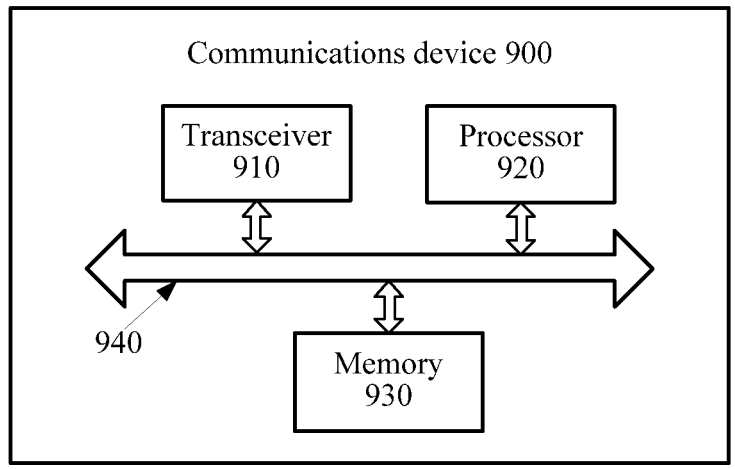
FIG. 12 is a schematic structural block diagram of a communications device according to yet another embodiment of this application.

FIG. 12 shows a communications device according to an embodiment of this application. The communications device includes a transceiver 910, a processor 920, a memory 930, and a bus system 940. The transceiver 910, the processor 920, and the memory 930 may be connected by using the bus system 940. The memory 930 may be configured to store an instruction. The processor 920 is configured to execute the instruction stored in the memory, to control the transceiver 910 to receive or send information.

The transceiver 910 is configured to receive fine timing measurement FTM request frames sent by at least two communications stations; and is configured to send a first FTM measurement frame according to the FTM request frame, where the first FTM measurement frame includes a measurement parameter of each of the at least two communications stations and identifier information used to indicate each communications station, so that each communications station obtains the measurement parameter of each communications station according to the identifier information.

Optionally, the first FTM measurement frame includes feedback indication information, and the feedback indication information is used to indicate a time interval at which each communications station sends response information after each communications station receives the first FTM measurement frame.

Optionally, the transceiver 910 is further configured to receive the response information that is sent by each communications station according to the first FTM measurement frame. The transceiver 910 is further configured to send a second FTM measurement frame to the at least two communications stations, where the second FTM measurement frame includes a sending moment of sending the first FTM measurement frame by the communications device, a receiving moment of the response information sent by each communications station, and the identifier information, so that each communications station obtains a corresponding receiving moment according to the identifier information.

Optionally, there is a correspondence between a sequence of the identifier information of each communications station and a sequence of sending the response information by each communications station after each communications station receives the first FTM measurement frame.

Optionally, the identifier information includes a MAC address or an AID.

It should be understood that in this embodiment of this application, the processor 920 may be a central processing unit (CPU), or the processor 920 may be another general purpose processor, a digital signal processor (DSP), an application-specific integrated circuit (ASIC), a field programmable gate array (FPGA), another programmable logic device, a discrete gate, a transistor logical device, a discrete hardware component, or the like. The general purpose processor may be a microprocessor or the processor may be any conventional processor, or the like.

The memory 930 may include a read-only memory and a random access memory, and provide an instruction and data to the processor 920. A part of the memory 930 may further include a non-volatile random access memory. For example, the memory 930 may further store device type information.

The bus system 940 may further include a power bus, a control bus, a status signal bus, and the like, in addition to a data bus. However, for clear description, various types of buses in the figure are marked as the bus system 940.

In an implementation process, operations in the foregoing methods may be completed by using an integrated logical circuit of hardware in the processor 920 or instructions in a form of software in the processor 920. The operations of the method disclosed with reference to the embodiments of this application may be directly performed by a hardware processor, or may be performed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 930, and the processor 920 reads information in the memory 930 and completes the operations in the foregoing methods in combination with hardware of the processor 910. To avoid repetition, details are not described herein again.

It should be understood that, the communications device 900 according to this embodiment of this application may correspond to the execution body of the method in the embodiments of this application, and the foregoing and other operations and/or functions of the modules in the apparatus 900 are respectively for implementing corresponding procedures in the methods in FIG. 2 to FIG. 7. For brevity, details are not described herein again.

Figure 13:
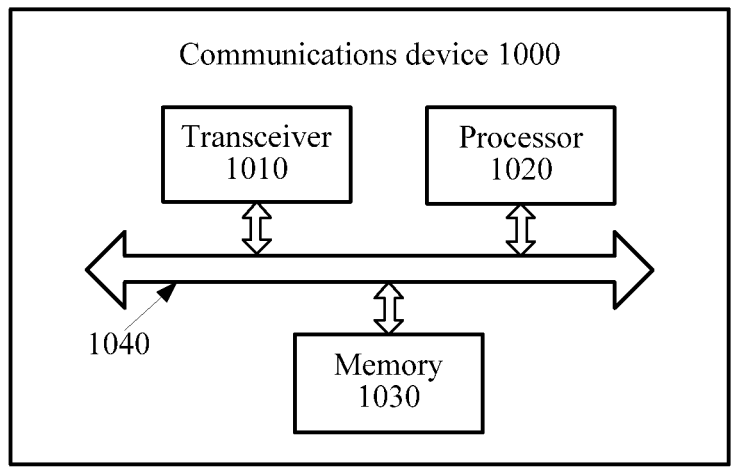
FIG. 13 is a schematic structural block diagram of a communications device according to yet another embodiment of this application.

FIG. 13 shows a communications device according to an embodiment of this application. The communications device includes a transceiver 1010, a processor 1020, a memory 1030, and a bus system 1040. The transceiver 1010, the processor 1020, and the memory 1030 may be connected by using the bus system 1040. The memory 1030 may be configured to store an instruction. The processor 1020 is configured to execute the instruction stored in the memory, to control the transceiver 1010 to receive or send information.

The transceiver 1010 is configured to: receive a first FTM request frame sent by at least one first communications device; send a first FTM measurement frame according to the first FTM request frame; receive response information that is sent by each of the at least one first communications device according to the first FTM measurement frame; receive a second FTM request frame sent by at least one second communications device; and send a second FTM measurement frame, where the second FTM measurement frame includes first identifier information used to indicate each first communications device, a sending moment of the first FTM measurement frame, a receiving moment of the response information that is sent by each first communications device according to the first FTM measurement frame, a measurement parameter of each of the at least one second communications device, and second identifier information used to indicate each second communications device, so that each first communications device obtains a corresponding receiving moment according to the first identifier information, and each second communications device obtains the measurement parameter according to the second identifier information.

Optionally, the first FTM measurement frame includes a measurement parameter of each first communications device and the first identifier information, so that each first communications device obtains the measurement parameter of each first communications device according to the first identifier information.

Optionally, the second FTM measurement frame includes feedback indication information, and the feedback indication information is used to indicate a time interval at which each second communications device sends response information after each second communications device receives the second FTM measurement frame.

Optionally, there is a correspondence between a sequence of the second identifier information of each second communications device and a sequence of sending the response information by each second communications device after each second communications device receives the second FTM measurement frame.

Optionally, both the first identifier information and the second identifier information include a MAC address or an AID.

It should be understood that in this embodiment of this application, the processor 1020 may be a central processing unit (CPU), or the processor 1020 may be another general purpose processor, a digital signal processor (DSP), an application-specific integrated circuit (ASIC), a field programmable gate array (FPGA), another programmable logic device, a discrete gate, a transistor logical device, a discrete hardware component, or the like. The general purpose processor may be a microprocessor or the processor may be any conventional processor, or the like.

The memory 1030 may include a read-only memory and a random access memory, and provide an instruction and data to the processor 1020. A part of the memory 1030 may further include a non-volatile random access memory. For example, the memory 1030 may further store device type information.

The bus system 1040 may further include a power bus, a control bus, a status signal bus, and the like, in addition to a data bus. However, for clear description, various types of buses in the figure are marked as the bus system 1040.

In an implementation process, operations in the foregoing methods may be completed by using an integrated logical circuit of hardware in the processor 1020 or instructions in a form of software in the processor 1020. The operations of the method disclosed with reference to the embodiments of this application may be directly performed by a hardware processor, or may be performed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 1030, and the processor 1020 reads information in the memory 1030 and completes the operations in the foregoing methods in combination with hardware of the processor 1020. To avoid repetition, details are not described herein again.

It should be understood that, the communications device 1000 according to this embodiment of this application may correspond to the execution body of the method in the embodiments of this application, and the foregoing and other operations and/or functions of the modules in the apparatus 1000 are respectively for implementing corresponding procedures in the methods in FIG. 2 to FIG. 7. For brevity, details are not described herein again.

Figure 14:
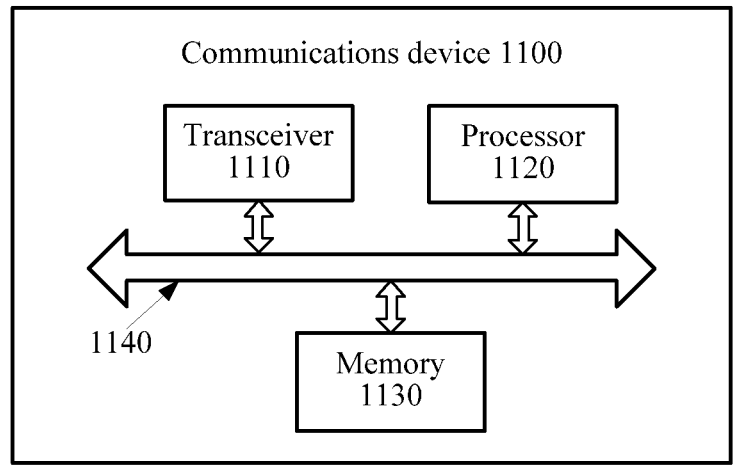
FIG. 14 is a schematic structural block diagram of a communications device according to yet another embodiment of this application.

FIG. 14 shows a communications device according to an embodiment of this application. The communications device includes a transceiver 1110, a processor 1120, a memory 1130, and a bus system 1140. The transceiver 1110, the processor 1120, and the memory 1130 may be connected by using the bus system 1140. The memory 1130 may be configured to store an instruction. The processor 1120 is configured to execute the instruction stored in the memory, to control the transceiver 1110 to receive or send information.

The transceiver 1110 is configured to: send a fine timing measurement FTM request frame to a response device; and receive a first FTM measurement frame that is sent by the response device according to the FTM request frame, where the first FTM measurement frame includes a measurement parameter of each of at least two devices and identifier information used to indicate each device.

The processor 1130 is configured to obtain the measurement parameter of the communications device according to the identifier information, where the communications device is one of the at least two devices.

Optionally, the first FTM measurement frame received by the transceiver 1120 includes feedback indication information, and the feedback indication information is used to indicate a time interval at which the communications device sends response information after the communications device receives the first FTM measurement frame.

Optionally, the transceiver 1110 is further configured to: send the response information to the response device according to the first FTM measurement frame; and receive a second FTM measurement frame sent by the response device, where the second FTM measurement frame includes a sending moment of sending the first FTM measurement frame by the response device, a receiving moment of receiving the response information of each device by the response device, and the identifier information.

The processor 1130 is further configured to obtain, according to the identifier information, a receiving moment corresponding to the communications device.

Optionally, there is a correspondence between a sequence of the identifier information of the communications device in the identifier information of the at least two devices and a sequence, of sending the response information by the communications device after the communications device receives the first FTM measurement frame, in sending the response information by the at least two devices after the at least two devices receive the first FTM measurement frame.

Optionally, the identifier information includes a MAC address or an AID.

It should be understood that in this embodiment of this application, the processor 1120 may be a central processing unit (CPU), or the processor 1120 may be another general purpose processor, a digital signal processor (DSP), an application-specific integrated circuit (ASIC), a field programmable gate array (FPGA), another programmable logic device, a discrete gate, a transistor logical device, a discrete hardware component, or the like. The general purpose processor may be a microprocessor or the processor may be any conventional processor, or the like.

The memory 1130 may include a read-only memory and a random access memory, and provide an instruction and data to the processor 1120. A part of the memory 1130 may further include a non-volatile random access memory. For example, the memory 1130 may further store device type information.

The bus system 1140 may further include a power bus, a control bus, a status signal bus, and the like, in addition to a data bus. However, for clear description, various types of buses in the figure are marked as the bus system 1140.

In an implementation process, operations in the foregoing methods may be completed by using an integrated logical circuit of hardware in the processor 1120 or instructions in a form of software in the processor 1020. The operations of the method disclosed with reference to the embodiments of this application may be directly performed by a hardware processor, or may be performed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 1130, and the processor 1120 reads information in the memory 1130 and completes the operations in the foregoing methods in combination with hardware of the processor 1120. To avoid repetition, details are not described herein again.

It should be understood that, the communications device 1100 according to this embodiment of this application may correspond to the execution body of the method in the embodiments of this application, and the foregoing and other operations and/or functions of the modules in the apparatus 1100 are respectively for implementing corresponding procedures in the methods in FIG. 2 to FIG. 7. For brevity, details are not described herein again.

Figure 15:
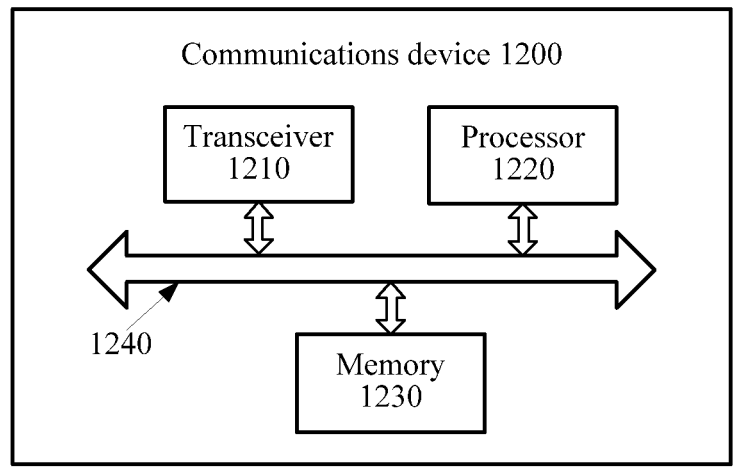
FIG. 15 is a schematic structural block diagram of a communications device according to yet another embodiment of this application.

FIG. 15 shows a communications device according to an embodiment of this application. The communications device includes a transceiver 1210, a processor 1220, a memory 1230, and a bus system 1240. The transceiver 1210, the processor 1220, and the memory 1230 may be connected by using the bus system 1240. The memory 1230 may be configured to store an instruction. The processor 1220 is configured to execute the instruction stored in the memory, to control the transceiver 1210 to receive or send information.

The transceiver 1210 is configured to: send a first fine timing measurement FTM request frame to a response device; receive a first FTM measurement frame that is sent by the response device according to the first FTM request frame; send response information to the response device; and receive a second FTM measurement frame sent by the response device, where the second FTM measurement frame includes first identifier information used to indicate the communications device, a sending moment of sending the first FTM measurement frame by the response device, a receiving moment of receiving the response information of the communications device by the response device, a measurement parameter of each of at least one first communications device, and second identifier information used to indicate each first communications device.

The processor 1230 is further configured to obtain, according to the first identifier information, a receiving moment corresponding to the communications device.

Optionally, the first FTM measurement frame includes the measurement parameter of the first communications device and the first identifier information; and the processor 1230 is further configured to obtain a measurement parameter of the communications device according to the first identifier information.

Optionally, the second FTM measurement frame includes feedback indication information, and the feedback indication information is used to indicate a time interval at which each first communications device sends response information after each first communications device receives the second FTM measurement frame.

Optionally, there is a correspondence between a sequence of the second identifier information of each first communications device and a sequence of sending the response information by each first communications device after each first communications device receives the second FTM measurement frame.

Optionally, the first identifier information and the second identifier information include a MAC address or an AID.

It should be understood that in this embodiment of this application, the processor 1220 may be a central processing unit (CPU), or the processor 1220 may be another general purpose processor, a digital signal processor (DSP), an application-specific integrated circuit (ASIC), a field programmable gate array (FPGA), another programmable logic device, a discrete gate, a transistor logical device, a discrete hardware component, or the like. The general purpose processor may be a microprocessor or the processor may be any conventional processor, or the like.

The memory 1230 may include a read-only memory and a random access memory, and provide an instruction and data to the processor 1220. A part of the memory 1230 may further include a non-volatile random access memory. For example, the memory 1230 may further store device type information.

The bus system 1240 may further include a power bus, a control bus, a status signal bus, and the like, in addition to a data bus. However, for clear description, various types of buses in the figure are marked as the bus system 1240.

In an implementation process, operations in the foregoing methods may be completed by using an integrated logical circuit of hardware in the processor 1220 or instructions in a form of software in the processor 1020. The operations of the method disclosed with reference to the embodiments of this application may be directly performed by a hardware processor, or may be performed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 1230, and the processor 1220 reads information in the memory 1230 and completes the operations in the foregoing methods in combination with hardware of the processor 1220. To avoid repetition, details are not described herein again.

It should be understood that, the communications device 1200 according to this embodiment of this application may correspond to the execution body of the method in the embodiments of this application, and the foregoing and other operations and/or functions of the modules in the apparatus 1200 are respectively for implementing corresponding procedures in the methods in FIG. 2 to FIG. 7. For brevity, details are not described herein again.

It should be understood that, in the embodiments of this application, "first" and "second" are merely used for distinguishing between different objects, but are not intended to limit the scope of the embodiments of this application.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm operations may be implemented by electronic hardware, computer software, or a combination thereof. To clearly describe the interchangeability between the hardware and the software, the foregoing has generally described compositions and operations of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on multiple network units. Some or all of the units may be selected according to actual requirements to achieve the objectives of the solutions of the embodiments of this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

What is claimed is:

1. A fine timing measurement (FTM) method, comprising:
    receiving an FTM request frame from one of a plurality of communication devices; and
    sending a first FTM measurement frame according to the FTM request frame, the first FTM measurement frame is sent to each of the plurality of communication devices, wherein the first FTM measurement frame comprises a measurement parameter for each of the plurality of communication devices, an identifier information identifying each of the plurality of communication devices, and feedback indication information, wherein the identifier information is used to enable each communication device to obtain the measurement parameter of each of the plurality of communication devices according to the identifier information, wherein the feedback indication information is used to indicate a time interval at which a communication device sends response information after the communication device receives the first FTM measurement frame, and wherein different communication devices correspond to different feedback indication information;
    receiving response information from each communication device according to the first FTM measurement frame; and
    sending a second FTM measurement frame, wherein the second FTM measurement frame comprises a sending moment of the first FTM measurement frame, a receiving moment of the response information sent by each communication device, and the identifier information, so that each communication device obtains a corresponding receiving moment according to the identifier information.

2. The method according to claim 1, wherein there is a correspondence between a sequence of the identifier information of each communication device and a sequence of sending the response information by each communication device after each communication device receives the first FTM measurement frame.

3. A fine timing measurement (FTM) method, comprising:
    sending, by a first communication device, an FTM request frame to a response device;
    receiving, by the first communication device, a first FTM measurement frame from the response device according to the FTM request frame, wherein the first FTM measurement frame comprises a measurement parameter of each of a plurality of communication devices, and identifier information identifying each of the plurality of communication devices; and obtaining, by the first communication device, the measurement parameter of the first communication device in the plurality of communication devices according to the identifier information;

wherein the first FTM measurement frame further comprises feedback indication information, the feedback indication information is used to indicate a time interval at which the first communication device sends response information after the first communication device receives the first FTM measurement frame, and different communication devices correspond to different feedback indication information;

sending, by the first communication device, the response information to the response device according to the first FTM measurement frame;

receiving, by the first communication device, a second FTM measurement frame from the response device, wherein the second FTM measurement frame comprises a sending moment of sending the first FTM measurement frame by the response device, a receiving moment of receiving response information of each of the plurality of communication devices by the response device, and the identifier information; and obtaining, by the first communication device according to the identifier information, a receiving moment corresponding to the first communication device.

4. The method according to claim 3, wherein there is a correspondence between a sequence of the identifier information of the first communication device in the identifier information of the plurality of communication devices and a sequence, of sending the response information by the first communication device after the first communication device receives the first FTM measurement frame, in sending the response information by the plurality of communication devices after the plurality of communication devices receive the first FTM measurement frame.

5. A communication device, comprising:
at least one processor; and
a non-transitory computer-readable storage medium coupled to the at least one processor and storing programming instructions for execution by the at least one processor, the at least one processor being configured to execute the programming instructions to control a transceiver to perform operations, the operations comprising:
receiving a fine timing measurement (FTM) request frame from one of a plurality of communication stations; and
sending a first FTM measurement frame according to the FTM request frame, the first FTM measurement frame is sent to each of the plurality of communication stations, wherein the first FTM measurement frame comprises a measurement parameter for each of the plurality of communication stations, an identifier information identifying each of the plurality of communication stations, and feedback indication information, wherein the identifier information is used to enable each communications station to obtain the measurement parameter of each of the plurality of communication stations according to the identifier information; wherein the feedback indication information is used to indicate a time interval at which a communication device sends response information after the communication device receives the first FTM measurement frame, and wherein different communication devices correspond to different feedback indication information;

receiving the response information from each communication station according to the first FTM measurement frame; and sending a second FTM measurement frame to the communication stations, wherein the second FTM measurement frame comprises a sending moment of sending the first FTM measurement frame by the communication device, a receiving moment of the response information sent by each communication station, and the identifier information, so that each communication station obtains a corresponding receiving moment according to the identifier information.

6. The communication device according to claim 5, wherein there is a correspondence between a sequence of the identifier information of each communication station and a sequence of sending the response information by each communication station after each communication station receives the first FTM measurement frame.

7. A communication device, comprising:
at least one processor; and
a non-transitory computer-readable storage medium coupled to the at least one processor and storing programming instructions for execution by the at least one processor, the processor being configured to execute the programming instructions to control a transceiver to perform operations, the operations comprising:
sending a fine timing measurement (FTM) request frame to a response device;
receiving a first FTM measurement frame from the response device according to the FTM request frame, wherein the first FTM measurement frame comprises a measurement parameter of each of a plurality of devices and identifier information identifying each of the plurality of devices; and
obtaining the measurement parameter of the communication device according to the identifier information, wherein the communication device is one of the plurality of devices;
wherein the first FTM measurement frame further comprises feedback indication information, the feedback indication information is used to indicate a time interval at which the communication device sends response information after the communication device receives the first FTM measurement frame, and different communication devices correspond to different feedback indication information;
sending the response information to the response device according to the first FTM measurement frame;
receiving a second FTM measurement frame sent by the response device, wherein the second FTM measurement frame comprises a sending moment of sending the first FTM measurement frame by the response device, a receiving moment of receiving response information of each of the plurality of devices by the response device, and the identifier information; and
obtaining, according to the identifier information, a receiving moment corresponding to the communication device.

8. The communication device according to claim 7, wherein there is a correspondence between a sequence of the identifier information of the communication device in the identifier information of the plurality of devices and a sequence, of sending the response information by the communication device after the communication device receives the first FTM measurement frame, in sending the response information by the devices after the devices receive the first FTM measurement frame.

9. The method according to claim 1, wherein the identifier information comprises a Media Access Control (MAC) address or an association identifier (AID).

10. The method according to claim 1, wherein the first FTM measurement frame or the second FTM measurement frame comprises function indication information used to indicate that a communications device supports multi-user measurement.

11. The method according to claim 1, wherein the first FTM measurement frame further comprises at least one of quantity information or message length information, wherein the quantity information is used to indicate a quantity of the plurality of communications devices and the message length information is used to indicate a length occupied by each of time information or parameter information of each communication device.

12. The method according to claim 3, wherein the identifier information comprises a Media Access Control (MAC) address or an association identifier (AID).

13. The method according to claim 3, wherein the first FTM measurement frame or the second FTM measurement frame comprises function indication information used to indicate that a communications device supports multi-user measurement.

14. The method according to claim 3, wherein the first FTM measurement frame further comprises at least one of quantity information or message length information, wherein the quantity information is used to indicate a quantity of the plurality of communications devices and the message length information is used to indicate a length occupied by each of time information or parameter information of each communication device.

15. The communication device according to claim 5, wherein the identifier information comprises a Media Access Control (MAC) address or an association identifier (AID).

16. The communication device according to claim 5, wherein the first FTM measurement frame or the second FTM measurement frame comprises function indication information used to indicate that a communications device supports multi-user measurement.

17. The communication device according to claim 5, wherein the first FTM measurement frame further comprises at least one of quantity information or message length information, wherein the quantity information is used to indicate a quantity of the plurality of communications devices and the message length information is used to indicate a length occupied by each of time information or parameter information of each communication device.

18. The communication device according to claim 7, wherein the identifier information comprises a Media Access Control (MAC) address or an association identifier (AID).

19. The communication device according to claim 7, wherein the first FTM measurement frame or the second FTM measurement frame comprises function indication information used to indicate that a communications device supports multi-user measurement.

20. The communication device according to claim 7, wherein the first FTM measurement frame further comprises at least one of quantity information or message length information, wherein the quantity information is used to indicate a quantity of the plurality of communications devices and the message length information is used to indicate a length occupied by each of time information or parameter information of each communication device.

* * * * *